US011757592B2

(12) United States Patent
Ryu et al.

(10) Patent No.: US 11,757,592 B2
(45) Date of Patent: Sep. 12, 2023

(54) UE CAPABILITY FOR DMRS BUNDLING

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Peter Gaal, San Diego, CA (US); Xiaojie Wang, Hillsborough, NJ (US); Wooseok Nam, San Diego, CA (US); Juan Montojo, San Diego, CA (US); Xiaoxia Zhang, San Diego, CA (US); Jing Sun, San Diego, CA (US); Mahmoud Taherzadeh Boroujeni, San Diego, CA (US); Piyush Gupta, Bridgewater, NJ (US); Hua Wang, Basking Ridge, NJ (US); Lik Hang Silas Fong, Bridgewater, NJ (US); Tianyang Bai, Somerville, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/468,172

(22) Filed: Sep. 7, 2021

(65) Prior Publication Data
US 2023/0073421 A1      Mar. 9, 2023

(51) Int. Cl.
*H04L 5/00* (2006.01)
(52) U.S. Cl.
CPC .......... *H04L 5/0051* (2013.01); *H04L 5/0096* (2013.01)
(58) Field of Classification Search
CPC ................ H04L 5/0051; H04L 5/0096
See application file for complete search history.

(56) References Cited

U.S. PATENT DOCUMENTS

2011/0110444 A1\*  5/2011 Roh ............... H04W 72/04
                                                   375/260
2020/0403768 A1\* 12/2020 Manolakos ...... H04W 72/1263
(Continued)

FOREIGN PATENT DOCUMENTS

WO       2022165505 A1     8/2022

OTHER PUBLICATIONS

Interdigital, et al., "Joint Channel Estimation for PUSCH", 3GPP TSG RAN WG 1 #106-e, R1-2107652, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 12 Pages, XP052038545, Sections 1-3.
(Continued)

*Primary Examiner* — Shukri Taha
(74) *Attorney, Agent, or Firm* — Sevan Savsa; Loza & Loza LLP

(57) ABSTRACT

Aspects relate to techniques for signaling the capability of a wireless communication device (e.g., a UE) to support demodulation reference signal (DMRS) bundling for channel estimation across two or more slots in the sidelink or uplink. In some examples, a transmitting UE may transmit a DMRS bundling indication to a receiving device (e.g., a receiving UE for sidelink DMRS bundling or a base station for uplink DMRS bundling). The DMRS bundling indication may indicate a capability of the transmitting UE to support DMRS bundling. The transmitting UE may then transmit a respective set of DMRSs within each of two or more slots during a DMRS bundling window to the receiving device based on the transmitting wireless communication device and the receiving device supporting DMRS bundling.

24 Claims, 14 Drawing Sheets

(56) References Cited

U.S. PATENT DOCUMENTS

2021/0014095 A1   1/2021  Ly et al.
2021/0028899 A1*  1/2021  Medles ................. H04L 5/0094

OTHER PUBLICATIONS

International Search Report and Written Opinion—PCT/US2022/039468—ISA/EPO—dated Nov. 21, 2022.

* cited by examiner

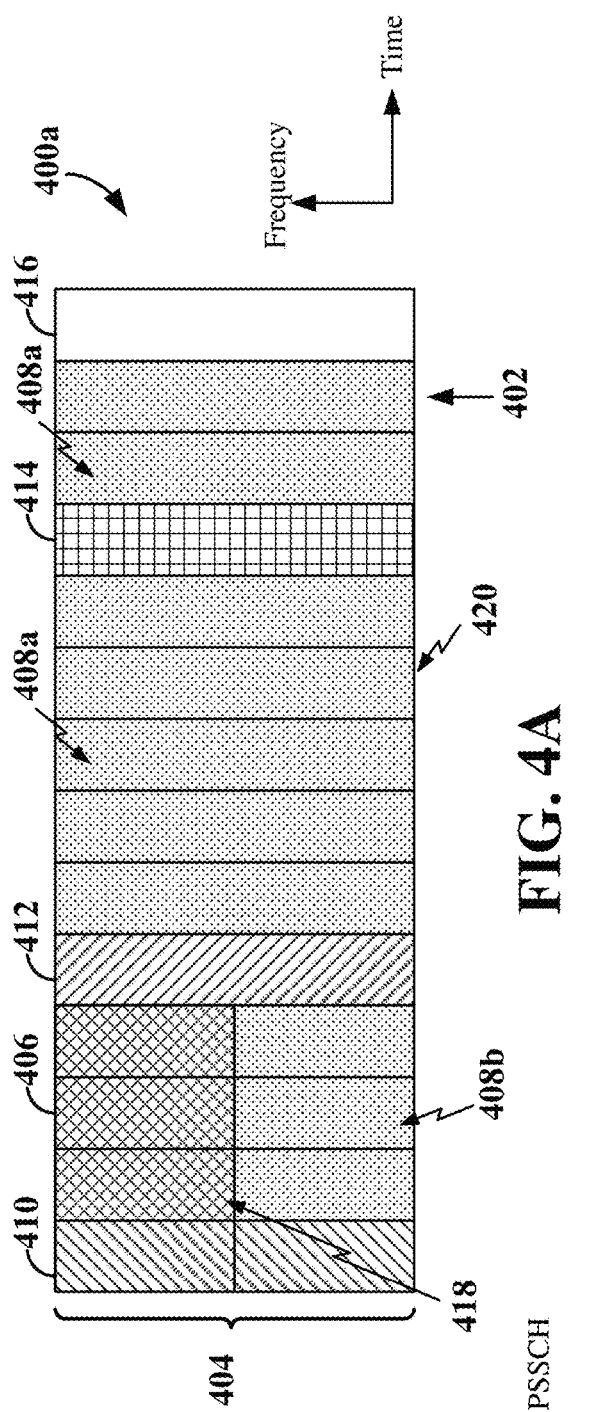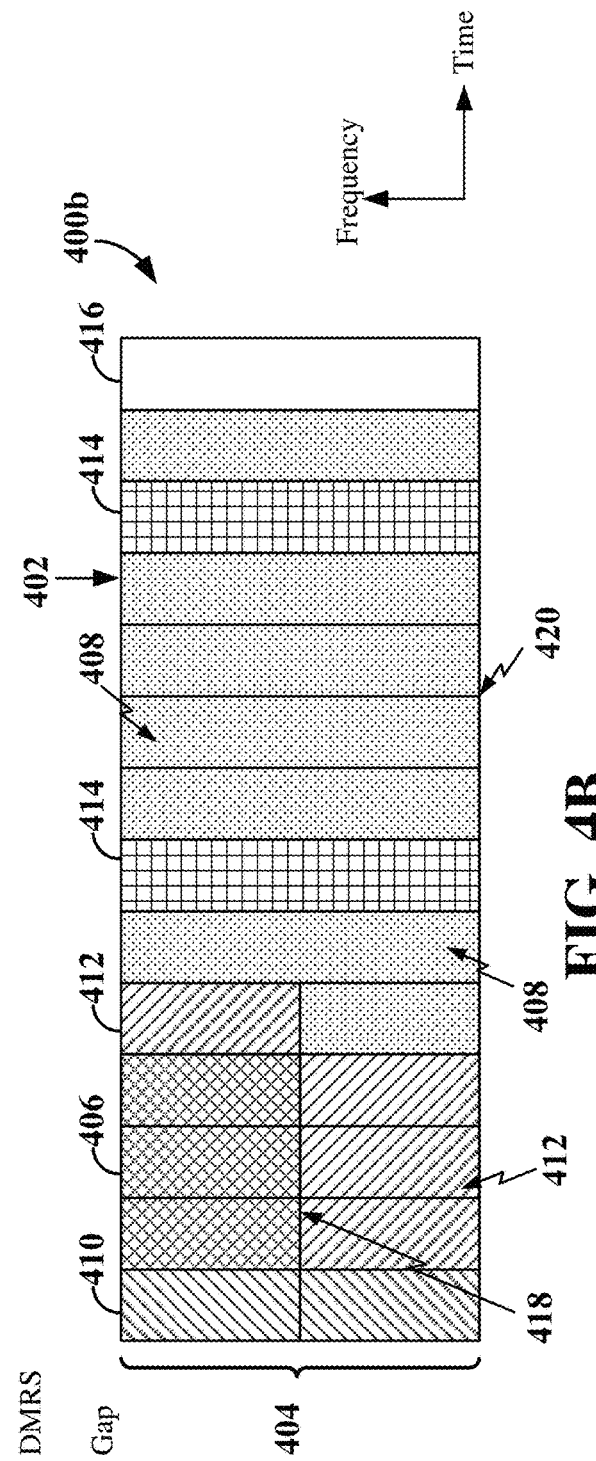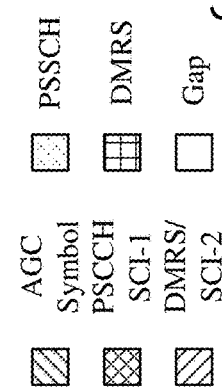
FIG. 4A
FIG. 4B

UE CAPABILITY FOR DMRS BUNDLING

TECHNICAL FIELD

The technology discussed below relates generally to wireless communication networks, and more particularly, to demodulation reference signal (DMRS) bundling in sidelink and/or uplink.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be transmitted in units of slots in the time domain and in units of sub-channels in the frequency domain Each slot may include both sidelink control information (SCI) and sidelink data traffic. The SCI may be transmitted over a physical sidelink control channel (PSCCH), while the sidelink data traffic may be transmitted over a physical sidelink shared channel (PSSCH) within resources reserved on a sidelink carrier by the SCI. Demodulation reference signals (DMRSs) may be transmitted in combination with the PSCCH and PSSCH to enable the receiver to estimate the channel and decode the information.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a transmitting wireless communication device in a wireless communication network is disclosed. The transmitting wireless communication device includes a transceiver, a memory, and a processor coupled to the transceiver and the memory. The processor and the memory can be configured to transmit a demodulation reference signal (DMRS) bundling indication to a receiving device. The DMRS bundling indication indicates a first capability of the transmitting wireless communication device to support DMRS bundling for channel estimation across two or more slots. The processor and the memory can further be configured to transmit a respective set of DMRSs within each of the two or more slots to the receiving device during a DMRS bundling window based on the transmitting wireless communication device and the receiving device each supporting DMRS bundling.

Another example provides a method for wireless communication at a transmitting wireless communication device in a wireless communication network. The method can include transmitting a demodulation reference signal (DMRS) bundling indication to a receiving device. The DMRS bundling indication indicates a first capability of the transmitting wireless communication device to support DMRS bundling for channel estimation across two or more slots. The method can further include transmitting a respective set of DMRSs within each of the two or more slots during a DMRS bundling window to the receiving device based on the transmitting wireless communication device and the receiving device supporting DMRS bundling.

Another example provides a transmitting wireless communication device in a wireless communication network. The transmitting wireless communication device can include means for transmitting a demodulation reference signal (DMRS) bundling indication to a receiving device. The DMRS bundling indication indicates a first capability of the transmitting wireless communication device to support DMRS bundling for channel estimation across two or more slots. The method can further include means for transmitting a respective set of DMRSs within each of the two or more slots during a DMRS bundling window to the receiving device based on the transmitting wireless communication device and the receiving device supporting DMRS bundling.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
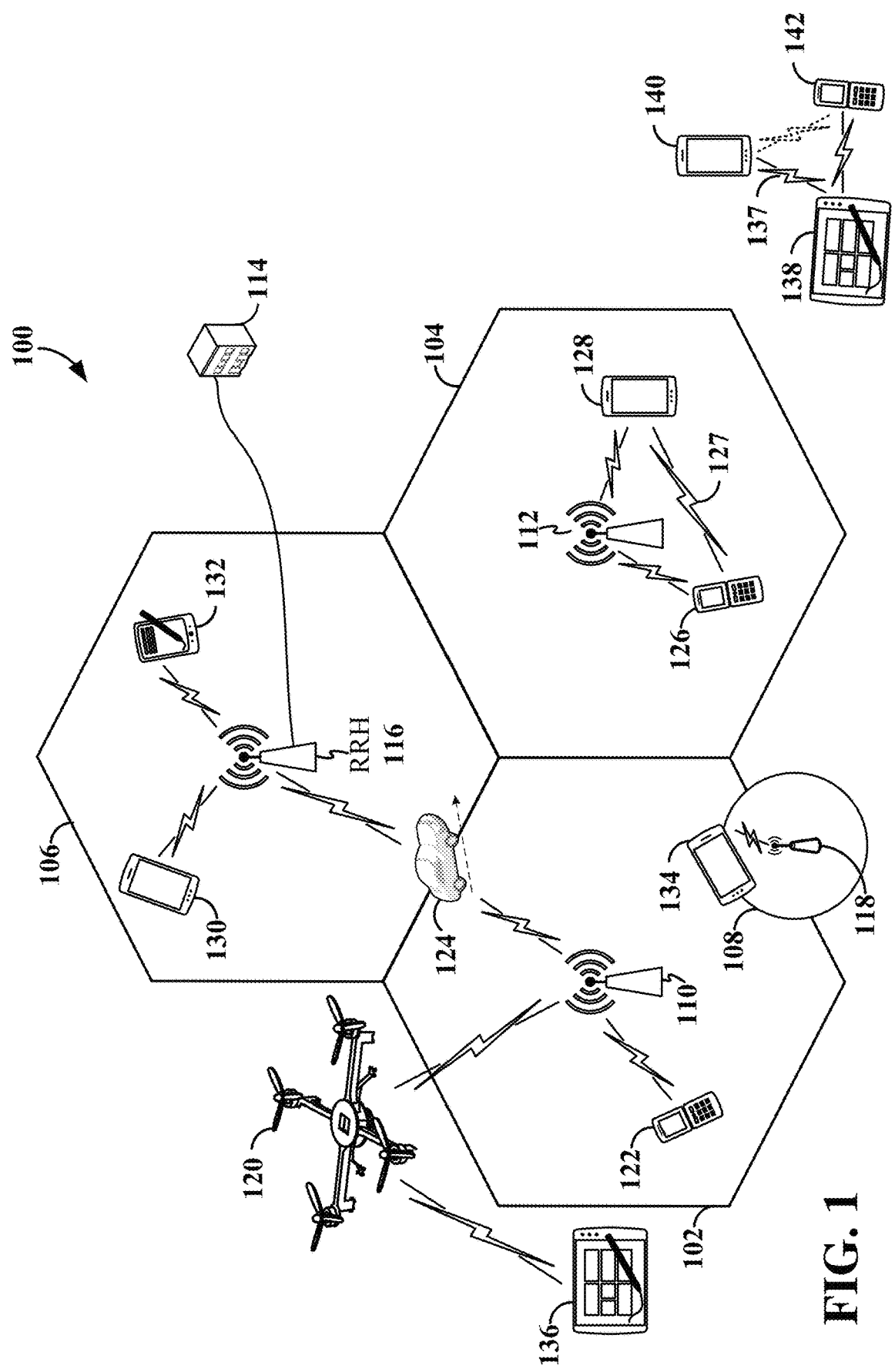
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to techniques for signaling the capability of a wireless communication device (e.g., a UE) to support DMRS bundling for channel estimation across two or more slots in the sidelink or uplink DMRS bundling may be utilized, for example, in channel conditions where the signal-to-noise ratio (SNR) at the receiver is too low to accurately estimate the channel using the DMRS in a single slot. Therefore, with DRMS bundling, the receiver may combine the DMRS from multiple (e.g., two or more) slots to better estimate the channel. In some examples, a transmitting UE may transmit a DMRS bundling indication to a receiving device. The receiving device may be, for example, a receiving UE for sidelink DMRS bundling or a base station for uplink DMRS bundling. In an example, the transmitting UE may transmit the DMRS bundling indication to the receiving UE via the base station. The DMRS bundling indication may indicate a capability of the transmitting UE to support DMRS bundling. In examples in which the receiving device is a base station, the transmitting UE may transmit a respective set of DMRSs within each of two or more slots during a DMRS bundling window to the base station based on the DMRS bundling indication indicating that the transmitting UE supports DMRS bundling.

In examples in which the receiving device is a receiving UE, the transmitting UE may further receive a DMRS bundling indication from the receiving UE indicating a capability of the receiving UE to support DMRS bundling. The transmitting UE may then transmit a respective set of DMRSs within each of two or more slots during a DMRS bundling window to the receiving UE based on the exchanged DMRS bundling indications indicating that both the transmitting and receiving UEs support DMRS bundling.

In some examples, the transmitting UE may further transmit a phase continuity indication that indicates a capability of the transmitting UE to maintain phase continuity between the two or more slots. For example, the phase continuity indication may indicate that the transmitting UE is capable of maintaining phase continuity between consecutive slots or between non-consecutive slots. In examples in which the transmitting UE is capable of maintaining phase continuity between non-consecutive slots, the phase continuity indication may further indicate a maximum time gap (e.g., a maximum number of slots) between the non-consecutive slots supported by the transmitting UE to maintain phase continuity. The phase continuity indication may further indicate that the transmitting UE is capable of maintaining phase continuity when switching communication directions, beams, and/or transmit power between the two or more slots. In some examples, the phase continuity indication may further indicate that the transmitting UE is capable of maintaining phase continuity when adjusting (e.g., changing) the carrier frequency and/or communication bandwidth between the two or more slots. In some examples, the transmitting UE may further transmit the respective set of DMRS within each of the two or more slots further based on the phase continuity indication.

In some examples, the transmitting UE may further receive a phase continuity indication indicating a capability of the receiving UE to maintain phase continuity between the two or more slots and/or a phase jump estimation indication from the receiving UE indicating a capability of the receiving UE to estimate a phase jump between the two or more slots. In this example, the transmitting UE may further transmit the respective set of DMRS within each of the two or more slots further based on the received phase continuity indication and/or the phase jump estimation indication. In some examples, the phase jump estimation indication may indicate that the receiving UE is capable of utilizing an automatic gain control (AGC) symbol or another symbol of a subsequent slot of the two or more slots for phase jump estimation.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
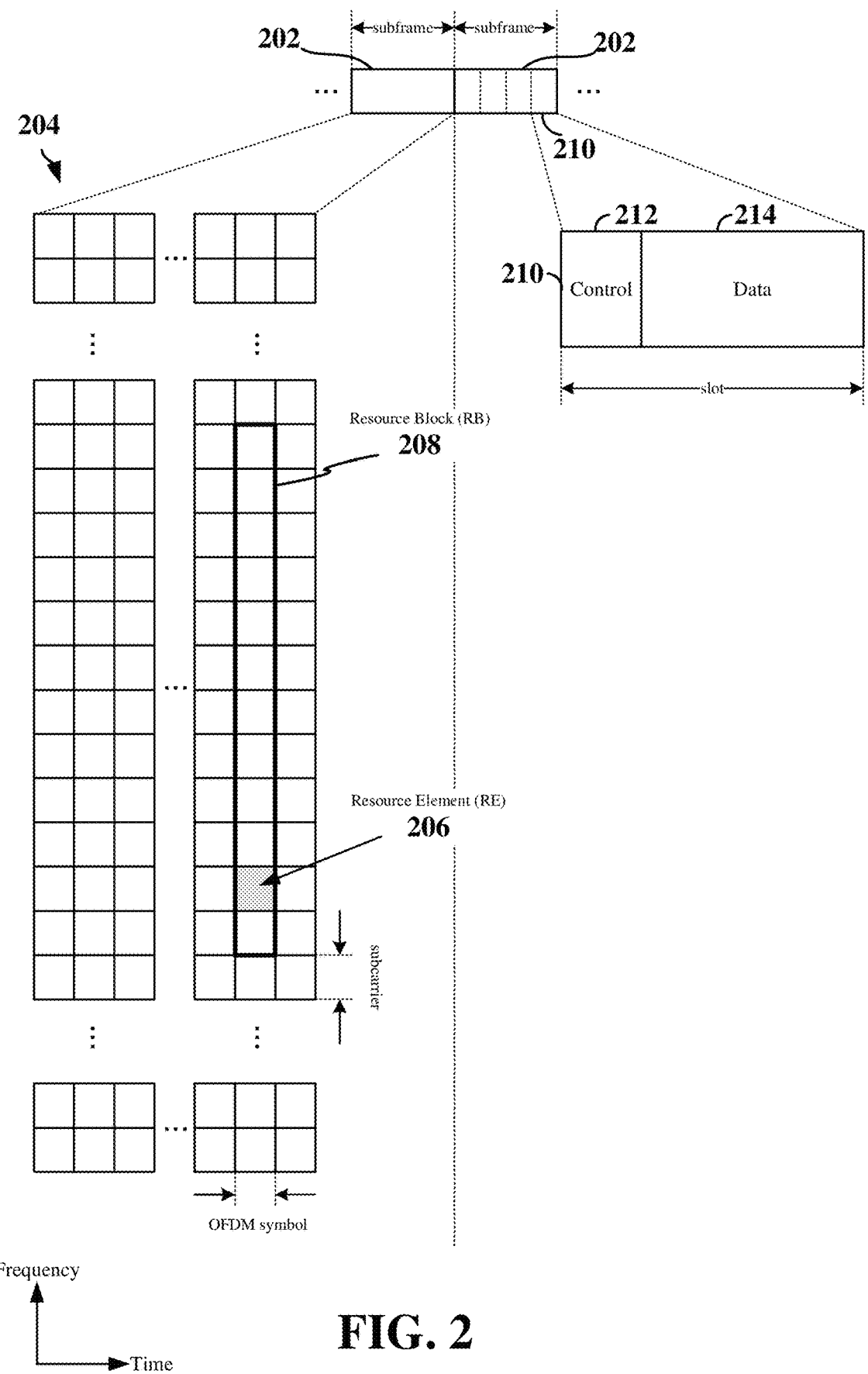
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
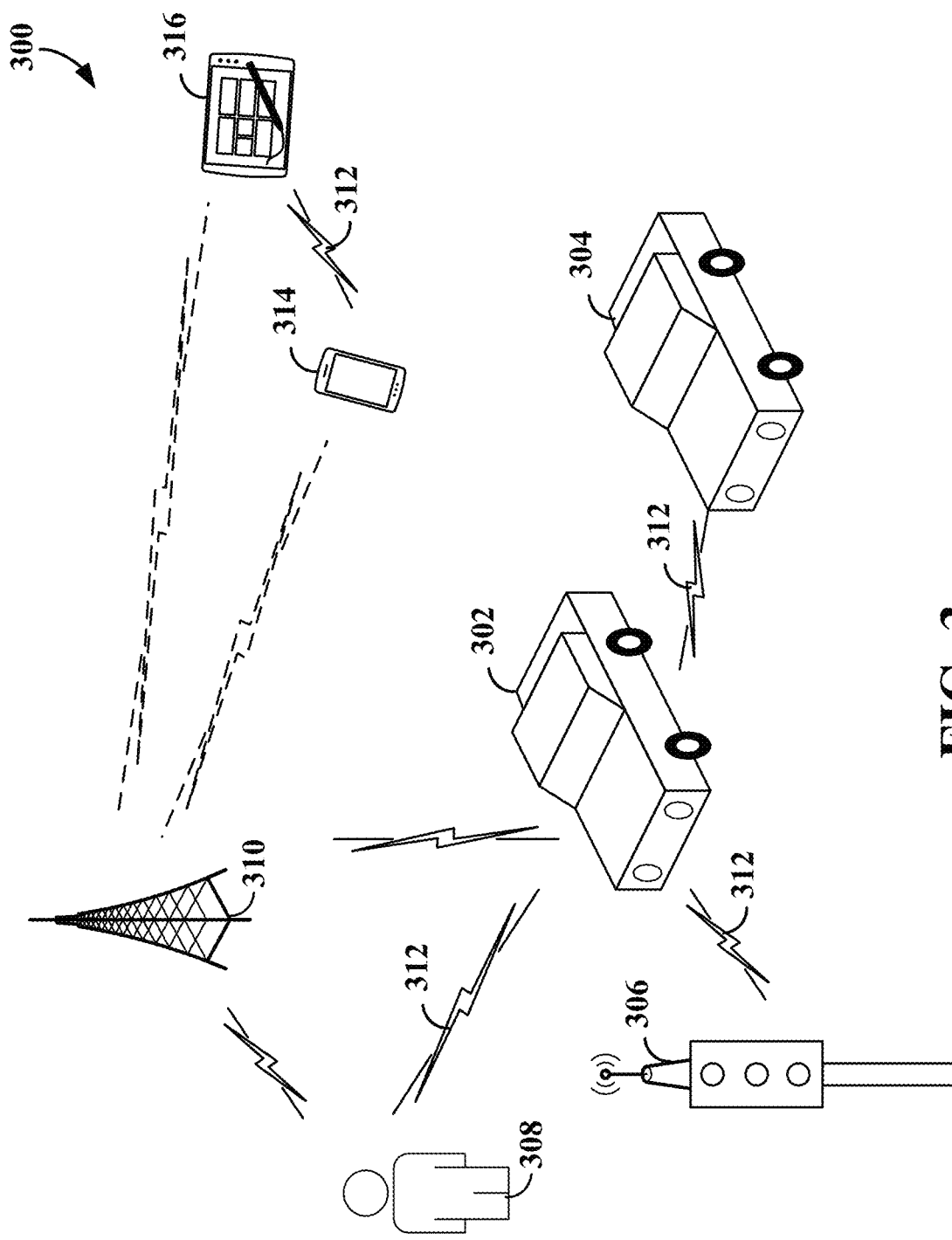
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

Figure 6:
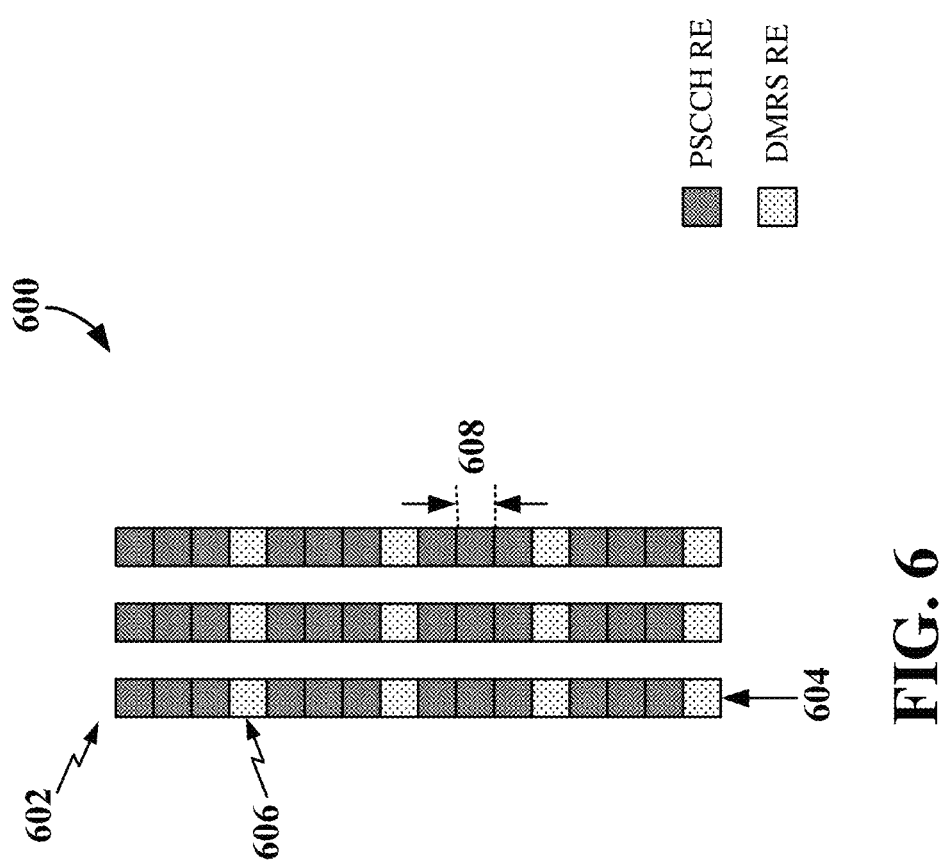
FIG. 6 is a diagram illustrating an example of a physical sidelink control channel (PSCCH) demodulation reference signal (DMRS) pattern according to some aspects.

FIG. 6 illustrates an example of a PSCCH DMRS pattern 600 according to some aspects. As shown in the example of FIG. 6, a PSCCH 602 may include three symbols 604, and a DMRS 606 may further be present in every PSCCH symbol 604. In some examples, the DMRS 606 may be placed on every fourth RE 608 of the PSCCH 602 and may be based on the Gold sequence. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs.

Referring again to FIGS. 4A and 4B, the PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
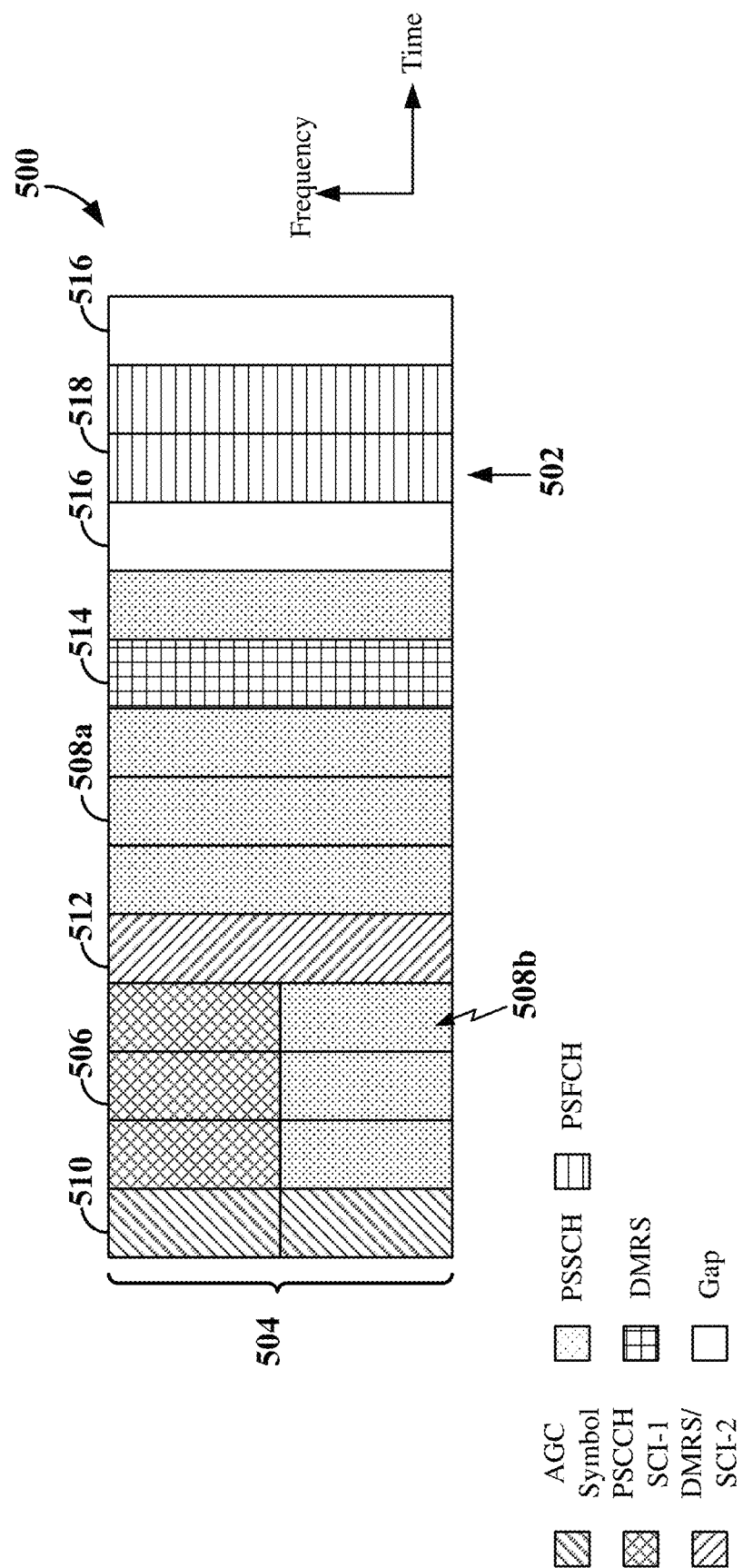
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region of the slot 500. The PSCCH 506 and PSSCH 508 are each transmitted on one or more symbols 502 of the slot 500. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In some examples, the DMRSs 514 may be based on a Gold sequence and a configuration type 1 may be used for the frequency domain pattern of the PSSCH DMRSs 514. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

In the examples shown in FIGS. 4-6, the set of DMRSs transmitted in combination with the PSCCH and PSSCH enable the receiver to estimate the channel and decode the information (e.g., SCI or sidelink data traffic). For example, as discussed above, a respective DMRS 606 is present on each symbol 602 of the PSCCH 406/506/602 and is placed on every fourth resource element (RE) 608 of the PSCCH 406/506/602. In addition, the PSSCH 408/508 may include DMRSs 414/514 configured in a two, three, or four symbol DMRS pattern selected by the transmitting UE. Thus, the set of DMRSs may include both the PSCCH DMRSs and PSSCH DMRSs. In examples in which the signal-to-noise ratio (SNR) at the receiver is too low to accurately estimate the channel using the set of DMRSs in a single slot, a receiving UE may utilize DMRS bundling to estimate the channel. In DMRS bundling, the receiving UE may utilize the respective set of DMRSs in each of two or more slots to estimate the channel.

Figure 7:
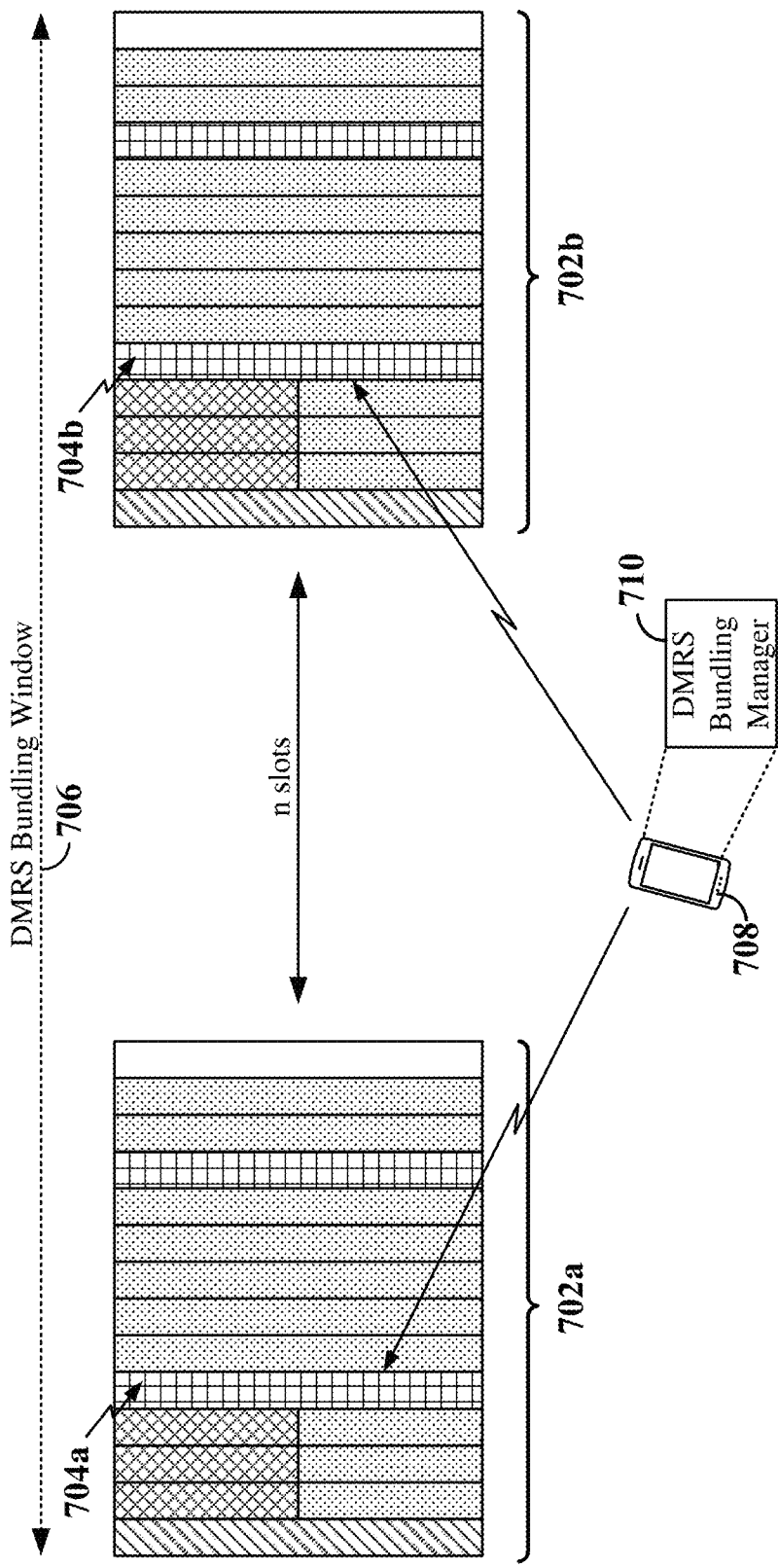
FIG. 7 is a diagram illustrating an example of DMRS bundling according to some aspects.

FIG. 7 illustrates an example of DMRS bundling according to some aspects. In the example shown in FIG. 7, two slots 702a and 702b, each including a respective set of DMRSs (e.g., DMRSs 704a and 704b), are transmitted by a transmitting UE over a DMRS bundling window 706. Each of the slots 702a and 702b may be separated by a number (n) of slots, where n represents a time gap between the slots and is an integer greater than or equal to zero (e.g., n=0, 1, 2, . . . ). In examples in which n is zero, the slots 702a and 702b are consecutive slots. In examples in which n is greater than zero, the slots 702a and 702b are non-consecutive slots.

A receiving UE 708 may receive each of the slots 702a and 702b within the DMRS bundling window 706. The receiving UE 708 may include a DMRS bundling manager 710 configured to utilize the respective sets of DMRSs 704a and 704b in each slot 702a and 702b to estimate the sidelink channel between the transmitting UE and the receiving UE. The DMRS bundling manager 710 may include, for example, circuitry and/or instructions (e.g., software) for executing a joint channel estimation algorithm to estimate the sidelink channel across the slots 702a and 702b. Based on the channel estimation, the receiving UE 708 may then decode the information (e.g., the PSCCH and PSSCH) received in each slot 702a and 702b.

DMRS bundling may be beneficial in low mobility scenarios with a slow changing channel (e.g., in a low mobility scenario, the channel may change slowly due to low Doppler). However, DMRS bundling with a multi-slot bundling window 706 may not be beneficial in high mobility scenarios, since the channel may change rapidly due to high Doppler. Therefore, DMRS bundling may not be desired in all sidelink scenarios. In addition, in order for the receiving UE 708 to benefit from DMRS bundling, the receiving UE 708 should be configured with a DMRS bundling manager 710 (e.g., a joint channel estimation algorithm executable by the DMRS bundling manager 710).

Various aspects of the disclosure relate to techniques to signal the capability of a UE to support DMRS bundling for channel estimation across two or more slots. By signaling their DMRS bundling capabilities, the UEs may configure DMRS bundling only when both UEs support this feature and in scenarios where the channel is changing slowly. For example, the UEs may configure and utilize a DMRS bundling window to transmit respective sets of DMRSs within each of two or more slots to enable joint channel estimation across the slots when both UEs are low mobility UEs that support DMRS bundling.

For example, a low mobility transmitting UE that supports DMRS bundling may transmit a DMRS bundling indication to a low mobility receiving UE to indicate that the transmitting UE supports DMRS bundling. In addition, the receiving UE may transmit a DMRS bundling indication back to the transmitting UE to indicate that the receiving UE supports DMRS bundling. The transmitting UE may then configure the DMRS bundling window and transmit the respective sets of DMRSs within each of two or more slots to enable the receiving UE to perform joint channel estimation across the two or more slots.

Figure 8:
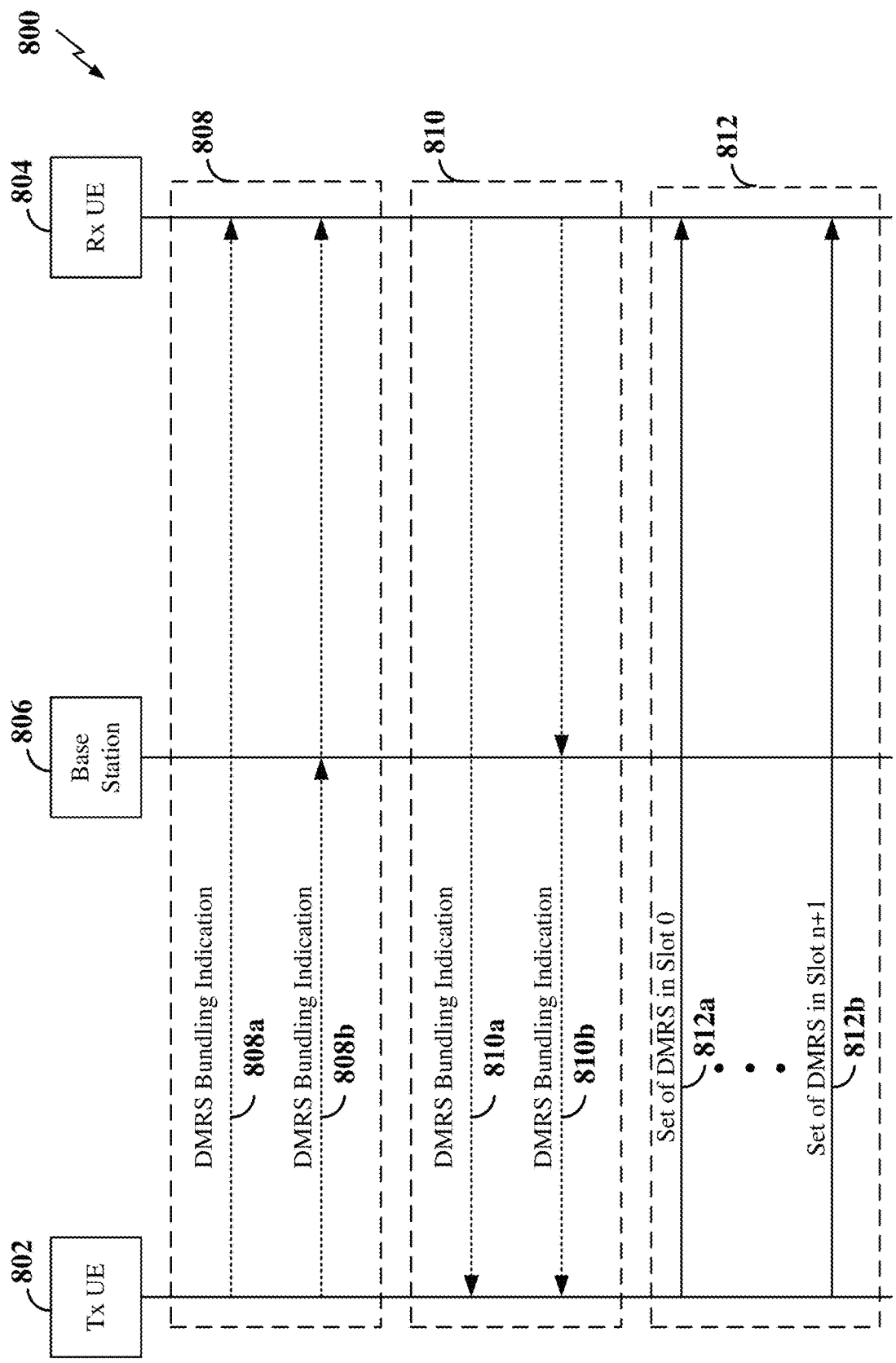
FIG. 8 is a diagram illustrating exemplary signaling for sidelink DMRS bundling between a transmitting (Tx) UE and a receiving (Rx) UE according to some aspects.

FIG. 8 illustrates exemplary signaling 800 for sidelink DMRS bundling between a transmitting (Tx) UE 802 and a receiving (Rx) UE 804 according to some aspects. In some examples, the signaling 800 may traverse a base station 806. The base station 806 may correspond to any of the base stations or other scheduling entities illustrated in any of FIGS. 1 and/or 3. In addition, the Tx UE 802 and Rx UE 804 may correspond to any of the UEs, sidelink devices, V2X devices, D2D devices, or other scheduled entities illustrated in any of FIGS. 1 and/or 3.

At 808, the Tx UE 802 may transmit a DMRS bundling indication to the Rx UE 804. The DMRS bundling indication may indicate whether the Tx UE 802 supports DMRS bundling. In some examples, as shown at 808*a*, the Tx UE 802 may transmit the DMRS bundling indication directly to the Rx UE 804 via a sidelink therebetween. For example, the DMRS bundling indication may be transmitted via a sidelink radio resource control (RRC) message, sidelink medium access control (MAC) control element (MAC-CE), or sidelink control information (SCI). In other examples, as shown at 808*b*, the Tx UE 802 may transmit the DMRS bundling indication to the Rx UE 804 via the base station 806 via respective Uu links between the Tx UE 802 and the base station 806 and the Rx UE 804 and the base station 806. For example, the DMRS bundling indication may be transmitted from the Tx UE 802 to the base station 806 via an uplink RRC message, uplink MAC-CE, or uplink control information (UCI). In addition, the DMRS bundling indication may further be transmitted from the base station 806 to the Rx UE 804 via a MAC-CE or downlink control information (DCI).

At 810, the Rx UE 804 may transmit a DMRS bundling indication to the Tx UE 802 that indicates whether the Rx UE 804 supports DMRS bundling (e.g., whether the Rx UE 804 is capable of performing joint channel estimation across multiple slots). In some examples, as shown at 810*a*, the Rx UE 804 may transmit the DMRS bundling indication directly to the Tx UE 802 via a sidelink therebetween. For example, the DMRS bundling indication may be transmitted via a sidelink RRC message, sidelink MAC-CE, or SCI. In other examples, as shown at 810*b*, the Rx UE 804 may transmit the DMRS bundling indication to the Tx UE 802 via the base station 806 via respective Uu links between the Rx UE 804 and the base station 806 and the Tx UE 802 and the base station 806. For example, the DMRS bundling indication may be transmitted from the Rx UE 804 to the base station 806 via an uplink RRC message, uplink MAC-CE, or UCI. In addition, the DMRS bundling indication may further be transmitted from the base station 806 to the Tx UE 802 via a MAC-CE or DCI.

At 812, the Tx UE 802 may perform DMRS bundling. For example, the Tx UE 802 may configure DMRS bundling (e.g., configure a DMRS bundling window, number of slots utilized for DMRS bundling, time gap between slots, and other suitable parameters). In some examples, the DMRS bundling configuration may be predefined (e.g., based on a factory setting and/or a NR sidelink standard or specification). In other examples, the Tx UE 802 may select the DMRS bundling configuration parameters and provide the DMRS bundling configuration to the Rx UE 804. The Tx UE 802 may then transmit a respective set of DMRSs within each of two or more slots during the DMRS bundling window to the Rx UE 804 via a sidelink therebetween for channel estimation by the Rx UE 804 across the two or more slots. For example, the Tx UE 802 may transmit a first set of DMRSs within a first slot (slot 0) at 812*a* and then transmit a second set of DMRSs within a second slot (slot n+1) at 812*b*. Here, n represents the number of slots between the first slot and the second slot, where n may be any integer greater than or equal to zero. In examples in which n is zero, the first slot and the second slot are consecutive slots. In examples in which n is greater than zero, the first slot and the second slot are non-consecutive slots.

The radio frequency (RF) component (e.g., RF transceiver) of a UE (e.g., the Tx UE 802) may introduce random phase terms in a transmission. Even though the phase terms are random, the terms may be the same between any two slots. If the phase terms are the same, there is phase continuity between the slots. For example, assume that the Tx UE 802 transmits the same OFDM symbol in two slots, denoted $v_1(t)$ and $v_2(t)$. Each transmission may be represented as:

$$v_1(t) = e^{j\phi_1} \Sigma_{k=0}^{N-1} X_k e^{j2\pi k t/T} \qquad \text{(Equation 1)}$$

and $$v_2(t) = e^{j\phi_2} \Sigma_{k=0}^{N-1} X_k e^{j2\pi k t/T}, \qquad \text{(Equation 2)}$$

where $e^{j\phi_1}$ and $e^{j\phi_1}$ are the random phase terms. If $\phi_1 = \phi_2$ in $v_1(t)$ and $v_2(t)$, then the Tx UE 802 maintains phase continuity between the transmissions. However, if $\phi_1 \neq \phi_2$ in $v_1(t)$ and $v_2(t)$, then the Tx UE 802 produces a phase jump of $\phi_1 - \phi_2$ from the first slot $v_1(t)$ to the second slot $v_2(t)$. Some UEs are capable of maintaining phase continuity under certain conditions, while other UEs are not. The ability to maintain phase continuity also applies to the Rx UE 804, as the RF component at the Rx UE 804 may also introduce random phase terms when receiving a signal.

Different random phase terms do not present a problem if the channel is estimated separately (independently) in each slot $v_1(t)$ and $v_2(t)$. However, different random phase terms may become problematic if the channel is to be estimated jointly from both slots $v_1(t)$ and $v_2(t)$. To avoid this issue, the Tx UE 802 and Rx UE 804 can maintain phase continuity across the slots utilized for joint channel estimation or the Rx UE 804 may estimate the phase jump between the slots utilized for joint channel estimation and subtract the phase jump from the channel estimation.

Therefore, various aspects of the disclosure further relate to techniques to signal the capability of a UE to maintain phase continuity for channel estimation across two or more slots. Various aspects of the disclosure further relate to techniques for a receiving (Rx) UE to signal its capability to estimate a phase jump between two or more slots. The UEs may then configure DMRS bundling based on the phase continuity and/or phase jump capabilities of the UEs. For example, the Tx UE may configure the DMRS bundling window for DMRS bundling and transmit the respective sets of DMRSs within each of two or more slots to the Rx UE when at least the Tx UE is capable of maintaining phase continuity. As another example, the Tx UE may configure the DMRS bundling window for DMRS bundling and transmit the respective sets of DMRSs within each of two or more slots to the Rx UE when the Rx UE is capable of phase jump estimation regardless of whether the Tx UE and/or Rx UE is capable of maintaining phase continuity.

Figure 9:
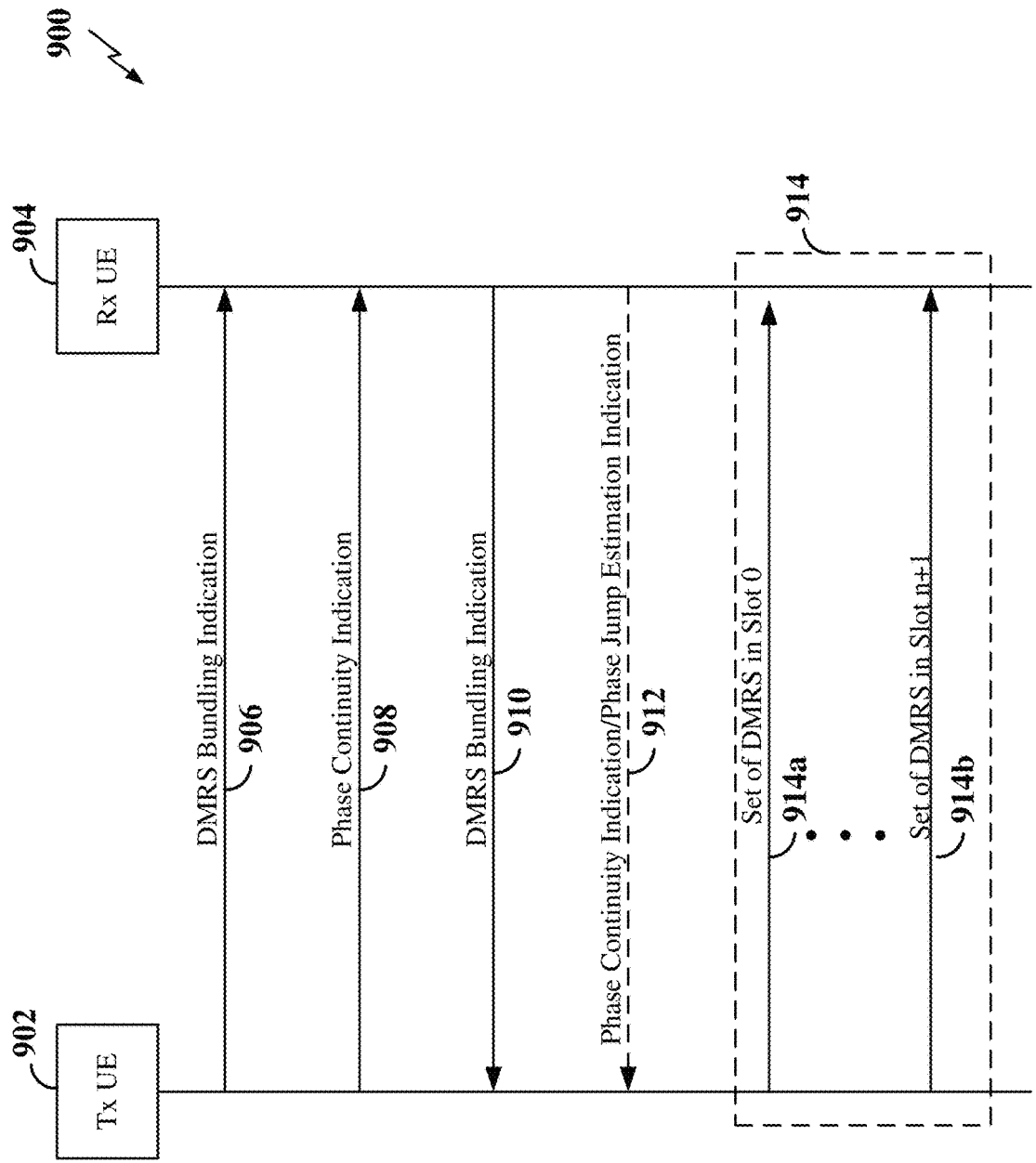
FIG. 9 is a diagram illustrating other exemplary signaling for sidelink DMRS bundling between a Tx UE and a Rx UE according to some aspects.

FIG. 9 illustrates other exemplary signaling 900 for sidelink DMRS bundling between a transmitting (Tx) UE 902 and a receiving (Rx) UE 904 according to some aspects. The Tx UE 902 and Rx UE 904 may correspond to any of the UEs, sidelink devices, V2X devices, D2D devices, or other scheduled entities illustrated in any of FIGS. 1, 3 and/or 8.

At 906, the Tx UE 902 may transmit a DMRS bundling indication to the Rx UE 904. The DMRS bundling indication may indicate whether the Tx UE 902 supports DMRS bundling. In some examples, the Tx UE 902 may transmit the DMRS bundling indication directly to the Rx UE 904 via a sidelink therebetween. For example, the DMRS bundling indication may be transmitted via a sidelink radio resource control (RRC) message, sidelink medium access control (MAC) control element (MAC-CE), or sidelink control information (SCI). In other examples, the Tx UE 902 may transmit the DMRS bundling indication to the Rx UE 904 via a base station in wireless communication with the Tx UE 902 and Rx UE 904, as described above.

At 908, the Tx UE 902 may further transmit a phase continuity indication to the Rx UE 904 (e.g., directly over the sidelink therebetween or indirectly via a base station). In some examples, the phase continuity indication may be transmitted together with the DMRS bundling indication (e.g., within a single RRC message, MAC-CE, or SCI). In other examples, the phase continuity indication may be transmitted separate from the DMRS bundling indication.

The phase continuity indication may indicate a capability of the Tx UE 902 to maintain phase continuity between the two or more slots utilized for DMRS bundling. In some examples, a UE may only be capable of maintaining phase continuity over consecutive slots. In this example, the phase continuity indication may indicate that the Tx UE 902 is capable of maintaining phase continuity between consecutive slots. In other examples, a UE may be capable of maintaining phase continuity over non-consecutive slots. In this example, the phase continuity indication may indicate that the Tx UE 902 is capable of maintaining phase continuity between non-consecutive slots. The phase continuity indication may further indicate a maximum time gap (e.g., number of slots) over which the Tx UE 902 may maintain phase continuity. For example, the phase continuity indication may indicate that the Tx UE 902 may maintain phase continuity between two non-consecutive slots with a maximum time gap corresponding to two slots (e.g., there can be no more than two slots between the non-consecutive slots or otherwise phase continuity cannot be maintained).

In some examples, the phase continuity indication may further indicate a maximum degree of change in the random phase terms allowed to maintain phase continuity. For example, $\phi_1$ and $\phi_2$ may be slightly different, while still maintaining phase continuity.

In some examples, a UE may only be capable of maintaining phase continuity over non-consecutive slots if the RF configuration remains unchanged during the time gap. Examples of RF configuration changes include, but are not limited to, switching communication direction (Tx-to-Rx or Rx-to-Tx), changing transmit power, switching the analog beam used for communication, changing the carrier frequency or bandwidth, adjusting the automatic gain control (AGC) setting, or switching DRX cycle states (e.g., sleep and wake-up).

For example, the Tx UE 902 may transmit a first sidelink transmission to Rx UE 904 in a first slot (slot 1) using a first beam (beam 1) and then transmit a second sidelink transmission to a different Rx UE in a second slot (slot 2) using a second beam (beam 2). The Tx UE 902 may then transmit a third sidelink transmission to the Rx UE 904 in a third slot (slot 3) using the first beam (beam 1). Since there is a beam switch in slot 2, the Tx UE 902 may not be capable of maintaining phase continuity between slots 1 and slot 3. Thus, the first sidelink transmission and the third sidelink transmission may experience different phase terms, which may prevent the Rx UE 904 from performing joint channel estimation using the DMRSs within slots 1 and 3. Therefore, the phase continuity indication may indicate whether the Tx UE 902 is capable of maintaining phase continuity if there is a beam switch in the time gap between the slots utilized for joint channel estimation. This may be relevant for sidelink UEs that serve as Uu relay UEs and/or in a sidelink network with PSFCH configured in the resource pool.

The phase continuity indication may further indicate whether the Tx UE 902 is capable of maintaining phase continuity in other RF configuration change scenarios. For example, the phase continuity indicator may indicate whether the Tx UE 902 is capable of maintaining phase continuity if there is a change in the transmit power in the time gap between the slots utilized for joint channel estimation. As another example, the phase continuity indicator may indicate whether the Tx UE 902 is capable of maintaining phase continuity if there is a change in the carrier frequency or bandwidth in the time gap between the slots utilized for joint channel estimation. As another example, the phase continuity indicator may indicate whether the Tx UE 902 is capable of maintaining phase continuity if there is a change in communication directions in the time gap between the slots utilized for joint channel estimation. As another example, the phase continuity indicator may indicate whether the Tx UE 902 is capable of maintaining phase continuity if there is a change in DRX cycle state or AGC settling in the time gap between the slots utilized for joint channel estimation. It should be understood that the phase continuity indication may include a respective indication for any combination of the above-listed RF configuration change scenarios.

In some examples, the phase continuity indicator may indicate whether the Tx UE 902 will maintain phase continuity between the slots utilized for joint channel estimation. For example, if the phase continuity indication indicates that the Tx UE 902 is incapable of maintaining phase continuity if there is a beam switch in the time gap, and the Tx UE indicates that the Tx UE 902 will maintain phase continuity between the slots utilized for joint channel estimation, the Tx UE 902 may not switch the beam to communicate with another UE or the base station in the time gap. Thus, in this example, the Tx UE 902 will avoid using the time gap for communications that may disrupt the phase continuity.

At 910, the Rx UE 904 may transmit a DMRS bundling indication to the Tx UE 902 that indicates whether the Rx UE 904 supports DMRS bundling (e.g., whether the Rx UE 904 is capable of performing joint channel estimation across multiple slots). In some examples, the Rx UE 904 may transmit the DMRS bundling indication directly to the Tx UE 902 via a sidelink therebetween. For example, the DMRS bundling indication may be transmitted via a sidelink RRC message, sidelink MAC-CE, or SCI. In other examples, the Rx UE 904 may transmit the DMRS bundling indication to the Tx UE 902 via a base station 806 in wireless communication with the Tx UE 902 and Rx UE 904, as described above.

At 912, the Rx UE 904 may further transmit a phase continuity indication and/or phase jump estimation indication to the Tx UE 902. (e.g., directly over the sidelink therebetween or indirectly via a base station). In some examples, the phase continuity indication may be transmitted together with the DMRS bundling indication (e.g., within a single RRC message, MAC-CE, or SCI). In other examples, the phase continuity indication may be transmitted separate from the DMRS bundling indication.

The phase continuity indication may indicate a capability of the Rx UE 904 to maintain phase continuity between the two or more slots (e.g., consecutive or non-consecutive) utilized for DMRS bundling and may further indicate the capability of the Rx UE 904 to maintain phase continuity in various RF configuration change scenarios. The phase continuity indication may further indicate that the Rx UE 904 will maintain phase continuity (e.g., avoid RF configuration changes that may disrupt phase continuity) across the slots utilized for joint channel estimation.

The phase jump estimation indication may indicate a capability of the Rx UE 904 to estimate a phase jump between the slots utilized for joint channel estimation. In some examples, the phase jump estimation indication may indicate the phase jump estimation mechanism(s) supported by the Rx UE 904. For example, the phase jump estimation indication may indicate that the Rx UE 904 is capable of utilizing an AGC symbol or another symbol (e.g., a second symbol) of a slot (e.g., a second or other subsequent slot of the two or more slots utilized for joint channel estimation) for phase jump estimation. As an example, an automatic gain controller (AGC) within the Rx UE 904 may settle quickly, and therefore, may allow the Rx UE 904 to use a remainder of an AGC symbol (after settling) for other purposes, such as phase jump estimation. However, if the AGC controller settles slowly, thus requiring the entire AGC symbol to settle, the phase jump estimation indication may indicate that the Rx UE 904 may use another symbol (e.g., with a known signal, such as a reference signal or other suitable signal) for phase jump estimation.

At 914, the Tx UE 902 may perform DMRS bundling based on the DMRS bundling indications and the phase continuity/phase jump estimation indications. For example, the Tx UE 902 may perform DMRS bundling based on both the Tx UE 902 and the Rx UE 904 supporting DMRS bundling. In addition, the Tx UE 902 may perform DMRS bundling based on both the Tx UE 902 and Rx UE 904 supporting DMRS bundling and at least the Tx UE 902 (or both the Tx UE 902 and Rx UE 904) supporting phase continuity. As another example, the Tx UE 902 may perform DMRS bundling based on both the Tx UE 902 and Rx UE 904 supporting DMRS bundling and the Rx UE 904 supporting phase jump estimation.

To perform DMRS bundling, the Tx UE 902 may configure DMRS bundling (e.g., configure a DMRS bundling window, number of slots utilized for DMRS bundling, time gap between the slots, and other suitable parameters). In some examples, the DMRS bundling configuration may be predefined based on the DMRS bundling indications and phase continuity/phase jump estimation indications (e.g., based on a factory setting and/or a NR sidelink standard or specification). In other examples, the Tx UE 902 may select the DMRS bundling configuration parameters and provide the DMRS bundling configuration to the Rx UE 904. The Tx UE 902 may then transmit a respective set of DMRSs within each of two or more slots during the DMRS bundling window to the Rx UE 904 via a sidelink therebetween for channel estimation by the Rx UE 904 across the two or more slots. For example, the Tx UE 902 may transmit a first set of DMRSs within a first slot (slot 0) at 914*a* and then transmit a second set of DMRSs within a second slot (slot n+1) at 914*b*, where n is any integer greater than or equal to zero.

Figure 10:
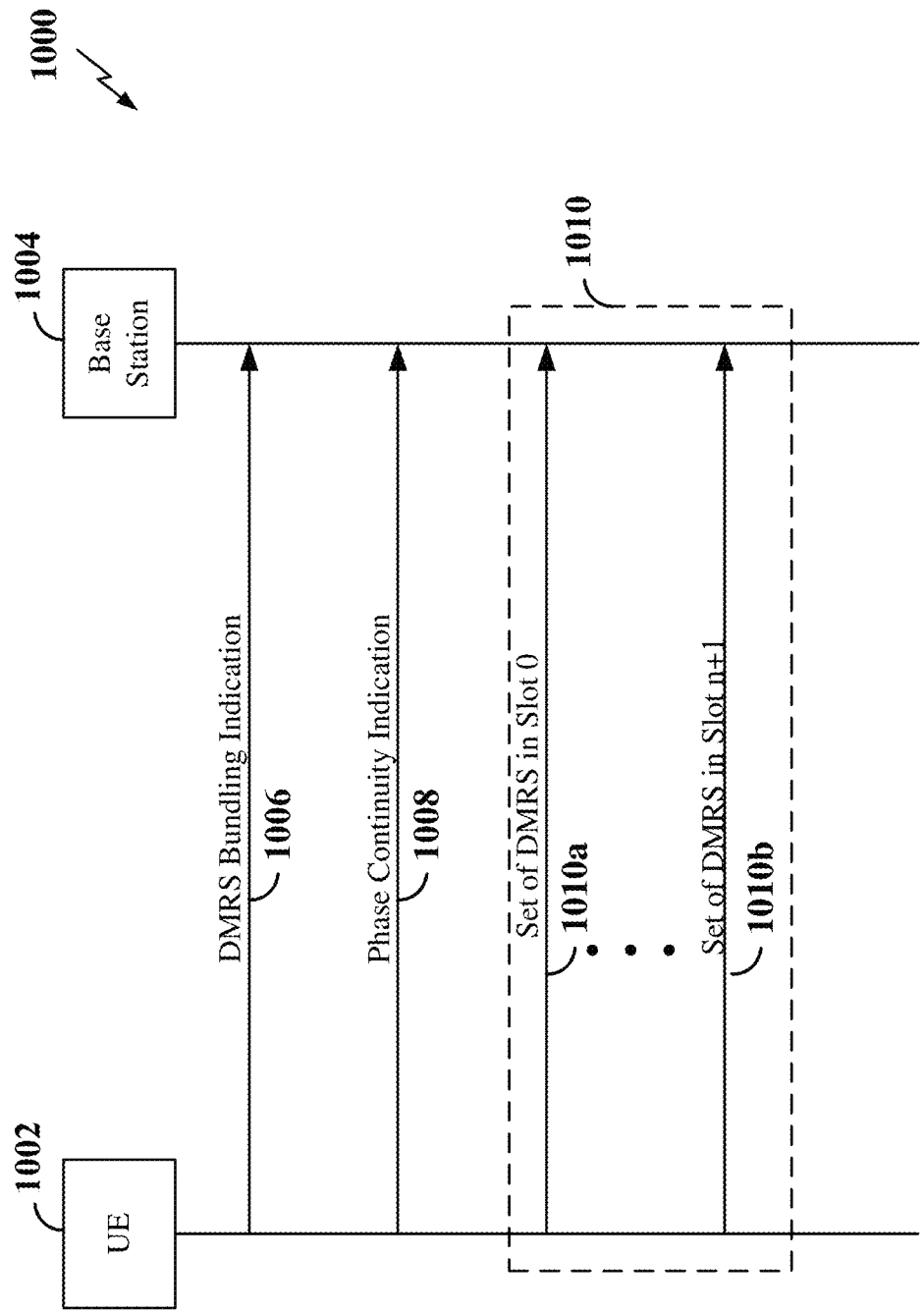
FIG. 10 is a diagram illustrating exemplary signaling for uplink DMRS bundling between a base station and a UE according to some aspects.

In some examples, DMRS bundling may also apply to uplink communications from a UE to a base station. FIG. 10 illustrates exemplary signaling 1000 for uplink DMRS bundling between a UE 1002 and a base station 1004. The base station 1004 may correspond to any of the base stations or other scheduling entities illustrated in any of FIGS. 1 and/or 3. In addition, the UE 1002 may correspond to any of the UEs or other scheduled entities illustrated in any of FIGS. 1 and/or 3.

At 1006, the UE 1002 may transmit a DMRS bundling indication to the base station 1004 via a Uu uplink. The DMRS bundling indication may indicate whether the UE 1002 supports DMRS bundling. In some examples, the DMRS bundling indication may be included within an RRC message, such as a UE Capability Information message. In other examples, the DMRS bundling indication may be transmitted to the base station 1004 via UCI or uplink MAC-CE. In some examples, the base station 1004 may transmit a DMRS bundling indication to the UE 1002 indicating whether the base station 1004 supports DMRS bundling. In other examples, it is assumed that the base station 1004 supports DMRS bundling.

At 1008, the UE 1002 may further transmit a phase continuity indication to the base station 1004. In some examples, the phase continuity indication may be transmitted together with the DMRS bundling indication (e.g., within the UE capability information). In other examples, the phase continuity indication may be transmitted separate from the DMRS bundling indication. The phase continuity indication may indicate a capability of the UE 1002 to maintain phase continuity between the slots utilized for DMRS bundling. For example, as discussed above, the phase continuity indication may indicate that the UE 1002 is capable of maintaining phase continuity over consecutive slots or non-consecutive slots. The phase continuity indication may further indicate a capability of the UE 1002 to maintain phase continuity based on various RF configuration changes. In addition, the phase continuity indicator may indicate whether the UE 1002 will maintain phase continuity between the slots utilized for joint channel estimation (e.g., avoid using a time gap between non-consecutive slots for communications that may disrupt the phase continuity).

Based on the DMRS bundling indication and the phase continuity indication, the base station 1004 and/or the UE 1002 may configure DMRS bundling (e.g., configure a DMRS bundling window, number of slots utilized for DMRS bundling, time gap between slots, and other suitable parameters). In some examples, the DMRS bundling configuration may be predefined based on the DMRS bundling indication and phase continuity indication (e.g., based on a factory setting and/or a NR sidelink standard or specification). In other examples, the base station 1004 may select the DMRS bundling configuration parameters and provide the DMRS bundling configuration to the UE 1002.

At 1010, the UE 1002 may then transmit a respective set of DMRSs within each of two or more uplink slots during the DMRS bundling window to the base station 1004 for channel estimation by the base station 1004 across the two or more slots. For example, the UE 1002 may transmit a first set of DMRSs within a first slot (slot 0) at 1010*a* and then transmit a second set of DMRSs within a second slot (slot n+1) at 1010*b*, where n is any integer greater than or equal to zero.

Figure 11:
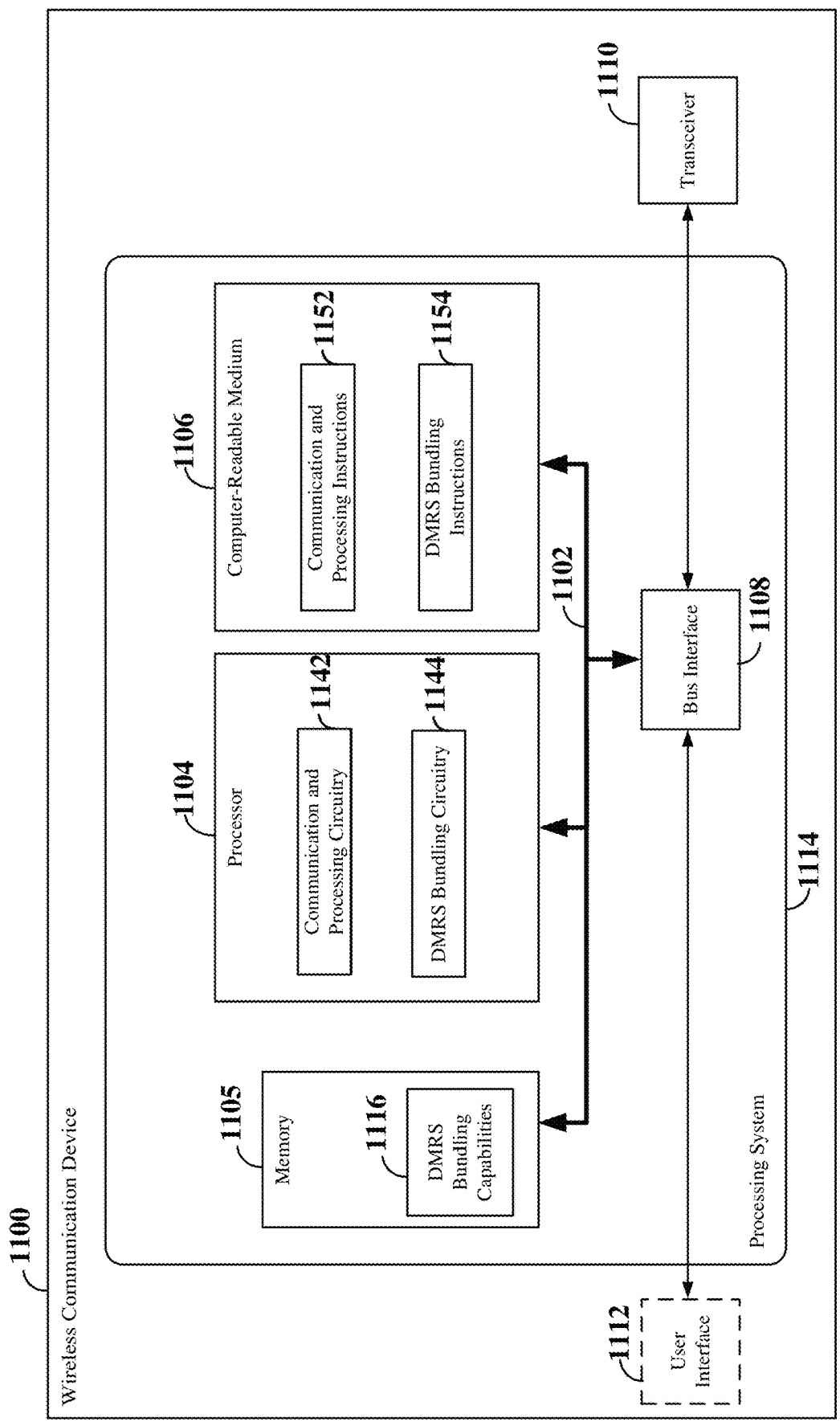
FIG. 11 is a block diagram illustrating an example of a hardware implementation for a wireless communication device employing a processing system according to some aspects.

FIG. 11 is a block diagram illustrating an example of a hardware implementation for a wireless communication device 1100 employing a processing system 1114. For example, the wireless communication device 1100 may correspond to a sidelink device, such as a V2X device, D2D device or other UE or wireless communication device configured for uplink and/or sidelink communication, as shown and described above in reference to FIGS. 1, 3, and/or 7-10.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a communication interface or a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store DMRS bundling capabilities 1116, which may be used by the processor 1104 in generating and/or processing sidelink and/or uplink transmissions.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more sidelink devices (e.g., other UEs) via respective sidelinks (e.g., PC5 interfaces). In addition, the communication and processing circuitry 1142 may be configured to communicate with a network entity (e.g., a base station, such as s gNB or eNB) via a Uu link. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

In some examples, the communication and processing circuitry 1142 may be configured to transmit a DMRS bundling indication to a base station or another wireless communication device (e.g., a receiving UE) via the transceiver 1110. In some examples, the communication and processing circuitry 1142 may be configured to transmit the DMRS bundling indication to the receiving UE via the base station. The communication and processing circuitry 1142 may further be configured to receive a DMRS bundling indication from the receiving UE via the transceiver 1110. In addition, the communication and processing circuitry 1142 may be configured to transmit a phase continuity indication to the base station or the receiving UE (e.g., either directly via a sidelink or indirectly via the base station) via the transceiver 1110. The communication and processing circuitry 1142 may further be configured to receive a phase continuity indication and/or a phase jump estimation indication from the receiving UE via the transceiver 1110.

The communication and processing circuitry 1142 may further be configured to transmit a respective set of DMRSs within each of two or more slots during a DMRS bundling window to the receiving device via the transceiver 1110. In some examples, the communication and processing circuitry 1142 may transmit the respective sets of DMRS within the two or more slots to a base station via an uplink or to a receiving UE via a sidelink. The communication and processing circuitry 1142 may further be configured to execute communication and processing instructions (software) 1152 stored in the computer-readable medium 1106 to implement one or more of the functions described herein.

The processor 1104 may further include DMRS bundling circuitry 1144, configured to communicate DMRS bundling capabilities 1116 between the wireless communication device 1100 and a receiving device (e.g., a receiving UE or base station). For example, the DMRS bundling circuitry 1144 may be configured to determine whether the wireless communication device 1100 supports DMRS bundling based on the DMRS bundling capabilities 1116 of the wireless communication device 1100, which may be stored, for example, in memory 1105. The DMRS bundling capabilities 1116 may include, for example, the DMRS bundling capability of the wireless communication device 1100 and other devices (e.g., the receiving device). In addition, the DMRS bundling capabilities 1116 may include phase continuity and/or phase jump estimation capabilities of the wireless communication device 1100 and other devices (e.g., the receiving UE).

The DMRS bundling circuitry 1144 may further be configured to operate together with the communication and processing circuitry 1142 and transceiver 1110 to transmit a DMRS bundling indication to the receiving device that indicates a capability of the wireless communication device to support DMRS bundling. In addition, the DMRS bundling circuitry 1144 may be configured to operate together with the communication and processing circuitry 1142 and transceiver 1110 to receive a DMRS bundling indication from the receiving device (e.g., the receiving UE) and to determine the capability of the receiving device to support DMRS bundling from the received DMRS bundling indication. The DMRS bundling circuitry 1144 may further store the DMRS bundling capability of the receiving device within the DMRS bundling capabilities 1116 in memory 1105.

The DMRS bundling circuitry 1144 may further be configured to determine a capability of the wireless communication device 1100 to maintain phase continuity between slots utilized for DMRS bundling from the DMRS bundling capabilities 1116 stored in memory 1105. The phase continuity capability of the wireless communication device 1100 stored as part of the DMRS bundling capabilities 1116 may include multiple phase continuity capabilities, each dependent upon one or more parameters, including, for example, whether the slots utilized for DMRS bundling are consecutive or non-consecutive, a time gap between the non-consecutive slots, a degree of change in random phase terms between the slots, and/or RF configuration changes between the slots.

The DMRS bundling circuitry 1144 may further operate together with the communication and processing circuitry 1142 and transceiver 1110 to transmit a phase continuity indication to the receiving device. In some examples, the phase continuity indication may indicate that the wireless communication device 1100 is capable of maintaining phase continuity based on the slots (e.g., two or more slots) utilized for DMRS bundling being consecutive slots. In some examples, the phase continuity indication may indicate that the wireless communication device 1100 is capable of maintaining phase continuity based on the slots utilized for DMRS bundling being non-consecutive slots. In this example, the phase continuity indication may indicate a maximum time gap between the non-consecutive slots over which the wireless communication device 1100 can maintain phase continuity. In some examples, the phase continuity indication may indicate a maximum degree of change in random phase terms between the two or more slots allowed to maintain phase continuity.

In some examples, the phase continuity indication may indicate that the wireless communication device is capable of maintaining phase continuity in response to the wireless communication device 1100 switching at least one of a communication direction, a beam, or a transmit power between the slots utilized for DMRS bundling. In some examples, the phase continuity indication may indicate that the wireless communication device is capable of maintaining phase continuity in response to the wireless communication device 1100 changing at least one of a carrier frequency or a bandwidth between the slots utilized for DMRS bundling. In some examples, the phase continuity indication may further indicate that the wireless communication device will maintain phase continuity between (e.g., across) the slots utilized for DMRS bundling.

In some examples, the DMRS bundling circuitry 1144 may further operate together with the communication and processing circuitry 1142 and transceiver 1110 to receive a phase continuity indication from the receiving device (e.g., the receiving UE) indicating the capability of the receiving device to maintain phase continuity. The DMRS bundling circuitry 1144 may further store the phase continuity capability of the receiving device within the DMRS bundling capabilities 1116 in memory 1105.

In some examples, the DMRS bundling circuitry 1144 may further operate together with the communication and processing circuitry 1142 and transceiver 1110 to receive a phase jump estimation indication from the receiving device (e.g., receiving UE) indicating a capability of the receiving device to estimate a phase jump between the slots utilized for DMRS bundling. For example, the phase jump estimation capability may indicate that the receiving device is capable of utilizing an AGC symbol or another symbol (e.g., a second symbol) of a subsequent slot of the DMRS bundling slots for phase jump estimation.

The DMRS bundling circuitry 1144 may further be configured to configure DMRS bundling based on the DMRS bundling capabilities 1116 of the wireless communication device 1100 and the receiving device. For example, the DMRS bundling circuitry 1144 may be configured to configure a DMRS bundling window, a number of slots utilized for DMRS bundling, a time gap between the slots, and other suitable parameters for DMRS bundling based on at least the wireless communication device 1100 and the receiving device supporting DMRS bundling. The DMRS bundling circuitry 1144 may further configure the DMRS bundling configuration based on the phase continuity capabilities of the wireless communication device 1100 and the receiving device and/or phase jump estimation capability of the receiving device. In some examples, the DMRS bundling circuitry 1144 may be configured to transmit the DMRS bundling configuration to the receiving device.

The DMRS bundling circuitry 1144 may further be configured to operate together with the communication and processing circuitry 1142 and transceiver 1110 to transmit the respective set of DMRSs within each of two or more slots to the receiving device during the DMRS bundling window based on the DMRS bundling configuration. In some examples, the DMRS bundling circuitry 1144 may further be configured to operate together with the communication and processing circuitry 1142 to avoid (e.g., prevent) using a time gap between non-consecutive DMRS bundling slots for other communications that may disrupt the phase continuity between the DMRS bundling slots. In this example, the phase continuity indication transmitted by the DMRS bundling circuitry 1144 may include confirmation that the wireless communication device 1100 will maintain phase continuity between the DMRS bundling slots. The DMRS bundling circuitry 1144 may further be configured to execute DMRS bundling instructions (software) 1154 stored in the computer-readable medium 1106 to implement one or more of the functions described herein.

Figure 12:
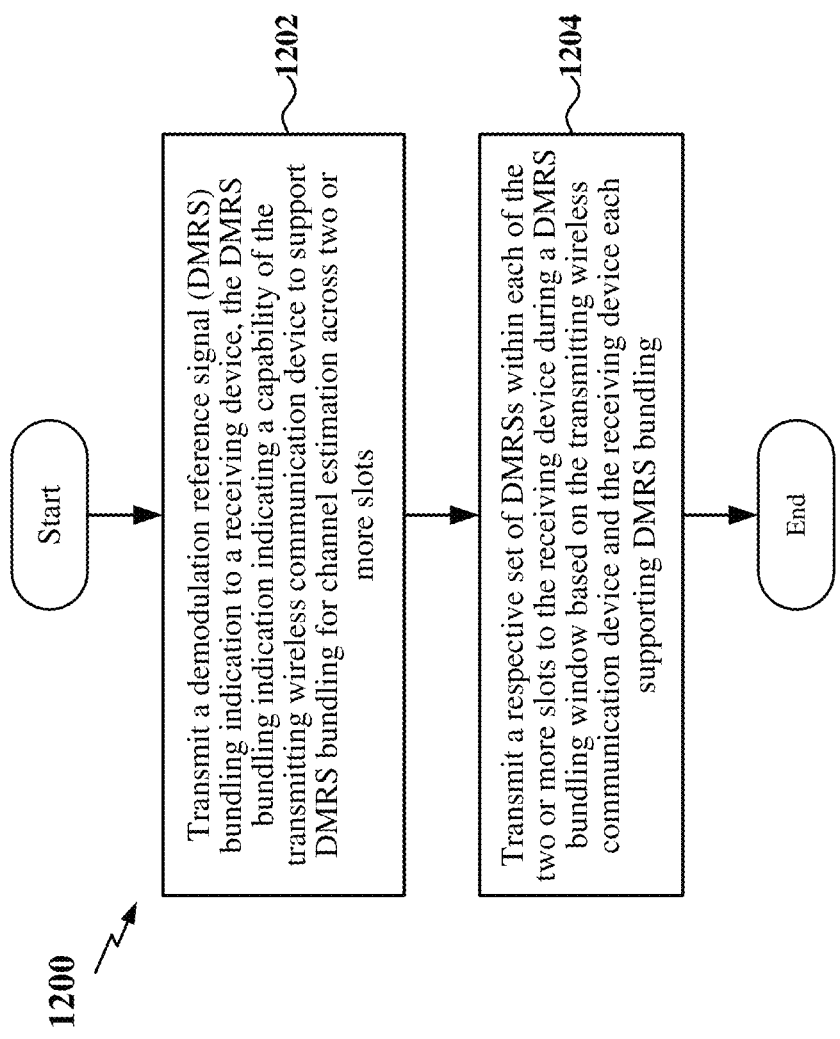
FIG. 12 is a flow chart of an exemplary method for DMRS bundling according to some aspects.

FIG. 12 is a flow chart of an exemplary method 1200 for DMRS bundling according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1202, the wireless communication device (e.g., a transmitting wireless communication device configured for sidelink and/or uplink communication) may transmit a demodulation reference signal (DMRS) bundling indication to a receiving device, the DMRS bundling indication indicating a capability of the transmitting wireless communication device to support DMRS bundling for channel estimation across two or more slots. In some examples, the transmitting wireless communication device may transmit the DMRS bundling indication to a base station in wireless communication with the transmitting wireless communication device. In some examples, the receiving device may be the base station. For example, the DMRS bundling circuitry 1144, together with the communication and processing circuitry 1142 and transceiver 1110, shown and described above in connection with FIG. 11, may provide a means to transmit the DMRS bundling indication.

At block 1204, the transmitting wireless communication device may transmit a respective set of DMRSs within each of the two or more slots to the receiving device during a DMRS bundling window based on the transmitting wireless communication device and the receiving device each supporting DMRS bundling. In some examples, the transmitting wireless communication device may transmit the respective set of DMRSs within each of the two or more slots during the DMRS bundling window to the receiving device via a sidelink therebetween. In some examples, the transmitting wireless communication device may transmit the respective set of DMRSs within each of the two or more slots during the DMRS bundling window to the base station. For example, the DMRS bundling circuitry 1144, together with the communication and processing circuitry 1142 and transceiver 1110, shown and described above in connection with FIG. 11, may provide a means to transmit the respective set of DMRSs within each of the two or more slots during the DMRS bundling window.

Figure 13:
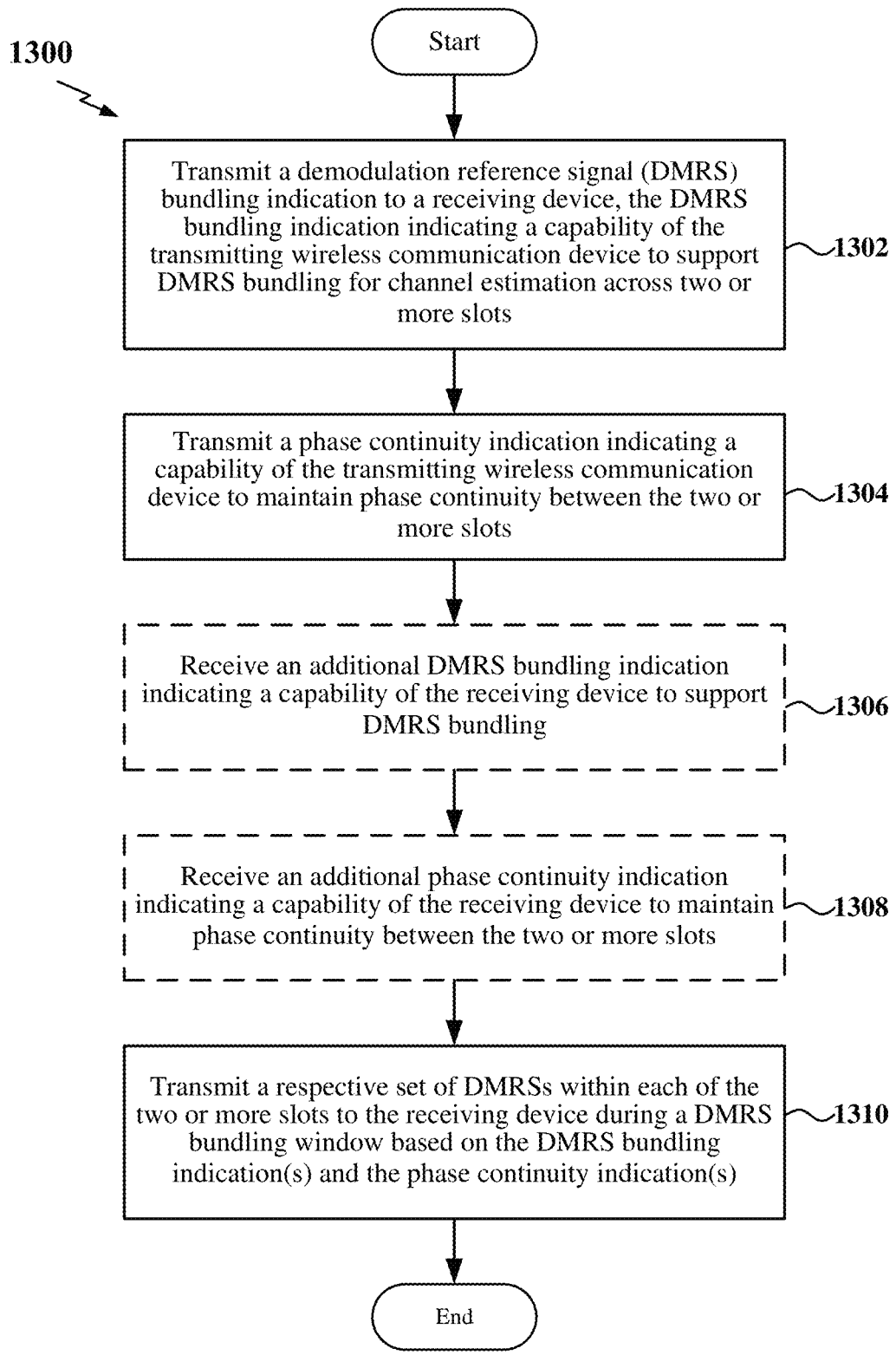
FIG. 13 is a flow chart of another exemplary method for DMRS bundling according to some aspects.

FIG. 13 is a flow chart of another exemplary method 1300 for DMRS bundling according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1302, the wireless communication device (e.g., a transmitting wireless communication device configured for sidelink and/or uplink communication) may transmit a demodulation reference signal (DMRS) bundling indication to a receiving device, the DMRS bundling indication indicating a capability of the transmitting wireless communication device to support DMRS bundling for channel estimation across two or more slots. In some examples, the transmitting wireless communication device may transmit the DMRS bundling indication to a base station in wireless communication with the transmitting wireless communication device. In some examples, the receiving device may be the base station. For example, the DMRS bundling circuitry 1144, together with the communication and processing circuitry 1142 and transceiver 1110, shown and described above in connection with FIG. 11, may provide a means to transmit the DMRS bundling indication.

At block 1304, the transmitting wireless communication device may transmit a phase continuity indication indicating a capability of the transmitting wireless communication device to maintain phase continuity between the two or more slots. In some examples, the phase continuity indication indicates that the transmitting wireless communication device is capable of maintaining phase continuity based on the two or more slots being consecutive slots. In some examples, the phase continuity indication indicates that the transmitting wireless communication device is capable of maintaining phase continuity based on the two or more slots being non-consecutive slots. In this example, the phase continuity indication further indicates a maximum time gap between the non-consecutive slots over which the transmitting wireless communication device can maintain phase continuity. In some examples, the phase continuity indication further indicates a maximum degree of change in random phase terms between the two or more slots allowed to maintain phase continuity.

In some examples, the phase continuity indication further indicates that the transmitting wireless communication device is capable of maintaining phase continuity in response to the transmitting wireless communication device switching a communication direction between the two or more slots. In some examples, the phase continuity indication further indicates that the transmitting wireless communication device is capable of maintaining phase continuity in response to the transmitting wireless communication device switching at least one of a beam or a transmit power between the two or more slots. In some examples, the phase continuity indication further indicates that the transmitting wireless communication device is capable of maintaining phase continuity in response to the transmitting wireless communication device changing at least one of carrier frequency or a bandwidth between the two or more slots. In some examples, the phase continuity indication further indicates that the transmitting wireless communication device will maintain phase continuity between the two or more slots. For example, the DMRS bundling circuitry 1144, together with the communication and processing circuitry 1142 and transceiver 1110, shown and described above in connection with FIG. 11, may provide a means to transmit the phase continuity indication.

At block 1306, the transmitting wireless communication device may optionally receive an additional DMRS bundling indication indicating a capability of the receiving device to support DMRS bundling. In some examples, the receiving device may be a receiving wireless communication device. For example, the DMRS bundling circuitry 1144, together with the communication and processing circuitry 1142 and transceiver 1110, shown and described above in connection with FIG. 11, may provide a means to receive the additional DMRS bundling indication.

At block 1308, the transmitting wireless communication device may optionally receive an additional phase continuity indication indicating a capability of the receiving device to maintain phase continuity between the two or more slots. In some examples, the receiving device may be a receiving wireless communication device. In some examples, the additional phase continuity indication may indicate one or more phase continuity capabilities of the receiving device, each dependent upon one or more parameters, including, for example, whether the two or more slots are consecutive or non-consecutive, a time gap between the non-consecutive slots, a degree of change in random phase terms between the slots, and/or RF configuration changes between the slots. For example, the DMRS bundling circuitry 1144, together with the communication and processing circuitry 1142 and transceiver 1110, shown and described above in connection with FIG. 11, may provide a means to receive the additional phase continuity indication.

At block 1310, the transmitting wireless communication device may transmit a respective set of DMRSs within each of the two or more slots to the receiving device during a DMRS bundling window based on the DMRS bundling indication(s) and the phase continuity indication(s). In some examples, the transmitting wireless communication device may transmit the respective set of DMRSs within each of the two or more slots during the DMRS bundling window to the receiving device via a sidelink therebetween. In some examples, the transmitting wireless communication device may transmit the respective set of DMRSs within each of the two or more slots during the DMRS bundling window to the base station. For example, the DMRS bundling circuitry 1144, together with the communication and processing circuitry 1142 and transceiver 1110, shown and described above in connection with FIG. 11, may provide a means to transmit the respective set of DMRSs within each of the two or more slots during the DMRS bundling window.

Figure 14:
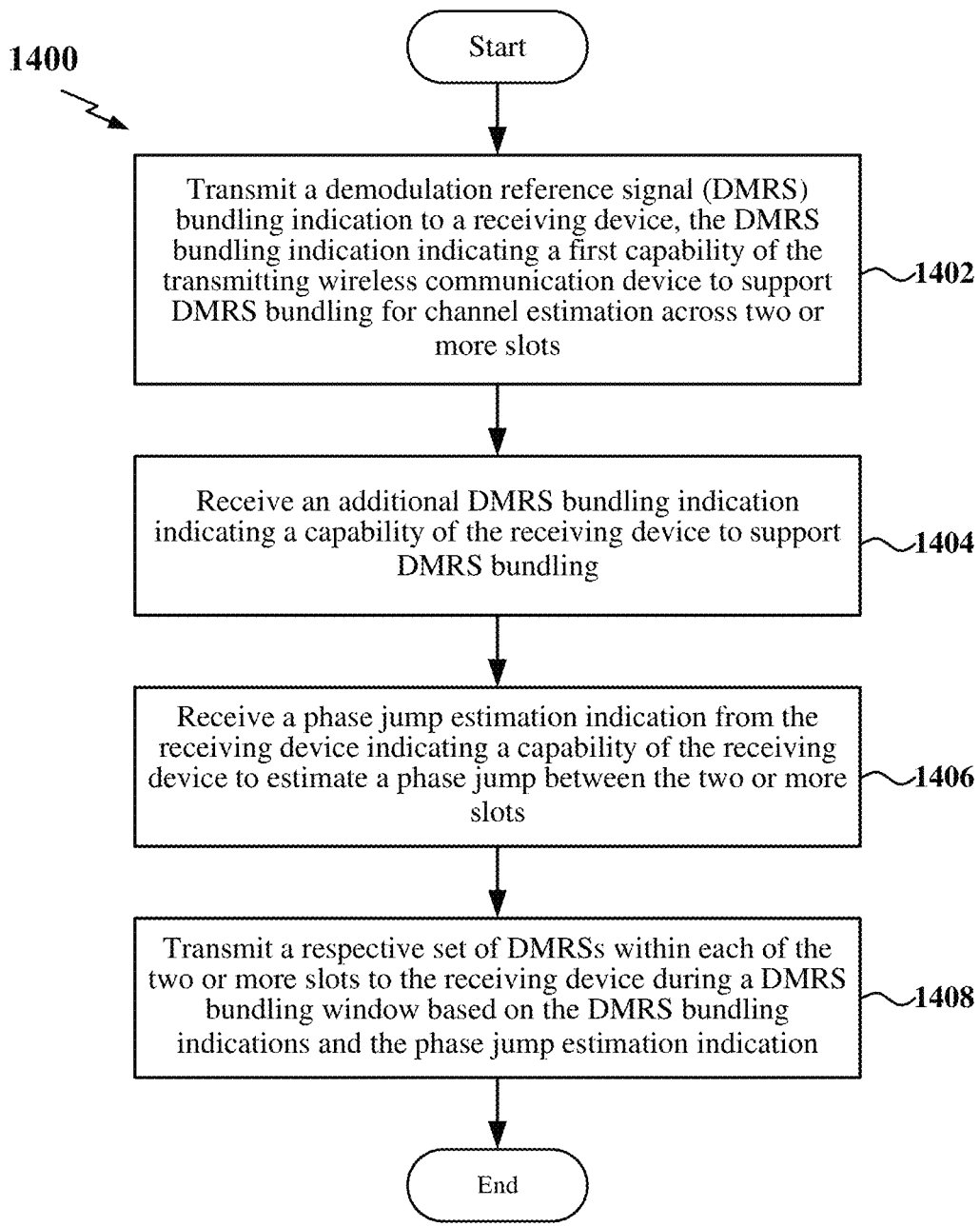
FIG. 14 is a flow chart of another exemplary method for DMRS bundling according to some aspects.

FIG. 14 is a flow chart of another exemplary method 1400 for DMRS bundling according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1402, the wireless communication device (e.g., a transmitting wireless communication device configured for sidelink and/or uplink communication) may transmit a demodulation reference signal (DMRS) bundling indication to a receiving device, the DMRS bundling indication indicating a capability of the transmitting wireless communication device to support DMRS bundling for channel estimation across two or more slots. In some examples, the transmitting wireless communication device may transmit the DMRS bundling indication to a base station in wireless communication with the transmitting wireless communication device for transmission to the receiving device. In some examples, the receiving device is a receiving wireless communication device. In some examples, the transmitting wireless communication device may further transmit a phase continuity indication indicating a capability of the transmitting wireless communication device to maintain phase continuity between the two or more slots. For example, the DMRS bundling circuitry 1144, together with the communication and processing circuitry 1142 and transceiver 1110, shown and described above in connection with FIG. 11, may provide a means to transmit the DMRS bundling indication.

At block 1404, the transmitting wireless communication device may receive an additional DMRS bundling indication indicating a capability of the receiving device (e.g., receiving wireless communication device) to support DMRS bundling. In some examples, the transmitting wireless communication device may further receive an additional phase continuity indication indicating a capability of the receiving wireless communication device to maintain phase continuity between the two or more slots. For example, the DMRS bundling circuitry 1144, together with the communication and processing circuitry 1142 and transceiver 1110, shown and described above in connection with FIG. 11, may provide a means to receive the additional DMRS bundling indication.

At block 1406, the transmitting wireless communication device may receive a phase jump estimation indication from the receiving device (e.g., receiving wireless communication device) indicating a capability of the receiving wireless communication device to estimate a phase jump between the two or more slots. For example, the phase jump estimation indication may indicate that the receiving wireless communication device is capable of utilizing an automatic gain control (AGC) symbol or another symbol of a subsequent slot of the two or more slots for phase jump estimation. For example, the DMRS bundling circuitry 1144, together with the communication and processing circuitry 1142 and transceiver 1110, shown and described above in connection with FIG. 11, may provide a means to receive the phase jump estimation indication.

At block 1408, the transmitting wireless communication device may transmit a respective set of DMRSs within each of the two or more slots to the receiving device (e.g., receiving wireless communication device) during a DMRS bundling window (e.g., via a sidelink therebetween) based on the DMRS bundling indications and the phase jump estimation indication. In some examples, the transmitting wireless communication device may transmit the respective set of DMRSs within each of the two or more slots during the DMRS bundling window to the receiving device via a sidelink therebetween. For example, the DMRS bundling circuitry 1144, together with the communication and processing circuitry 1142 and transceiver 1110, shown and described above in connection with FIG. 11, may provide a means to transmit the respective set of DMRSs within each of the two or more slots during the DMRS bundling window.

In one configuration, the wireless communication device 1100 includes means for transmitting a demodulation reference signal (DMRS) bundling indication to a receiving device, the DMRS bundling indication indicating a first capability of the transmitting wireless communication device to support DMRS bundling for channel estimation across two or more slots, as described in the present disclosure. The wireless communication device 1100 further includes means for transmitting a respective set of DMRSs within each of the two or more slots to the receiving device during a DMRS bundling window based on the transmitting wireless communication device and the receiving device each supporting DMRS bundling. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 3, and/or 7-11, and utilizing, for example, the processes and/or algorithms described herein in relation to FIG. 12-14.

The processes shown in FIGS. 12-14 may include additional aspects, such as any single aspect or any combination of aspects described below and/or in connection with one or more other processes described elsewhere herein.

Aspect 1: A method for wireless communication at a transmitting wireless communication device in a wireless communication network, the method comprising: transmitting a demodulation reference signal (DMRS) bundling indication to a receiving device, the DMRS bundling indication indicating a first capability of the transmitting wireless communication device to support DMRS bundling for channel estimation across two or more slots; and transmitting a respective set of DMRSs within each of the two or more slots during a DMRS bundling window to the receiving device based on the transmitting wireless communication device and the receiving device supporting DMRS bundling.

Aspect 2: The method of aspect 1, further comprising: transmitting a phase continuity indication indicating a second capability of the transmitting wireless communication device to maintain phase continuity between the two or more slots, and wherein the transmitting the respective set of DMRSs within each of the two or more slots during the DMRS bundling window further comprises: transmitting the respective set of DMRSs within each of the two or more slots during the DMRS bundling window to the receiving device based on the phase continuity indication.

Aspect 3: The method of aspect 2, wherein the phase continuity indication indicates that the transmitting wireless communication device is capable of maintaining phase continuity based on the two or more slots being consecutive slots.

Aspect 4: The method of aspect 2 or 3, wherein the phase continuity indication indicates that the transmitting wireless communication device is capable of maintaining phase continuity based on the two or more slots being non-consecutive slots.

Aspect 5: The method of aspect 4, wherein the phase continuity indication further indicates a maximum time gap between the non-consecutive slots over which the transmitting wireless communication device can maintain phase continuity.

Aspect 6: The method of any of aspects 2 through 4, wherein the phase continuity indication further indicates a maximum degree of change in random phase terms between the two or more slots allowed to maintain phase continuity.

Aspect 7: The method of any of aspects 2 through 6, wherein the phase continuity indication further indicates that the transmitting wireless communication device is capable of maintaining phase continuity in response to the transmitting wireless communication device switching a communication direction between the two or more slots.

Aspect 8: The method of any of aspects 2 through 7, wherein the phase continuity indication further indicates that the transmitting wireless communication device is capable of maintaining phase continuity in response to the transmitting wireless communication device switching at least one of a beam or a transmit power between the two or more slots.

Aspect 9: The method of any of aspects 2 through 8, wherein the phase continuity indication further indicates that the transmitting wireless communication device is capable of maintaining phase continuity in response to the first wireless communication device changing at least one of carrier frequency or a bandwidth between the two or more slots.

Aspect 10: The method of any of aspects 2 through 9, wherein the phase continuity indication further indicates that the transmitting wireless communication device will maintain phase continuity between the two or more slots.

Aspect 11: The method of any of aspects 2 through 10, further comprising: receiving an additional phase continuity indication indicating a third capability of the receiving device to maintain phase continuity between the two or more slots, and wherein the transmitting the respective set of DMRSs within each of the two or more slots during the DMRS bundling window further comprises: transmitting the respective set of DMRSs within each of the two or more slots during the DMRS bundling window to the receiving device based on the phase continuity indication and the additional phase continuity indication.

Aspect 12: The method of any of aspects 1 through 11, wherein the receiving device comprises a receiving wireless communication device, and further comprising: receiving an additional DMRS bundling indication indicating a fourth capability of the receiving wireless communication device to support DMRS bundling.

Aspect 13: The method of aspect 12, further comprising: receiving a phase jump estimation indication from the receiving wireless communication device indicating a fifth capability of the receiving wireless communication device to estimate a phase jump between the two or more slots, and wherein the transmitting the respective set of DMRSs within each of the two or more slots during the DMRS bundling window further comprises: transmitting the respective set of DMRSs within each of the two or more slots during the DMRS bundling window to the receiving wireless communication device via a sidelink therebetween based on the phase jump estimation indication.

Aspect 14: The method of aspect 13, wherein the phase jump estimation indication indicates that the receiving wireless communication device is capable of utilizing an automatic gain control (AGC) symbol or another symbol of a subsequent slot of the two or more slots for phase jump estimation.

Aspect 15: The method of any of aspects 1 through 11, wherein the transmitting the DMRS bundling indication further comprises: transmitting the DMRS bundling indication to a base station in wireless communication with the transmitting wireless communication device.

Aspect 16: The method of aspect 15, wherein the transmitting the respective set of DMRSs within each of the two or more slots during the DMRS bundling window further comprises: transmitting the respective set of DMRSs within each of the two or more slots during the DMRS bundling window to the receiving device via a sidelink therebetween.

Aspect 17: The method of aspect 15, wherein the receiving device comprises the base station, and wherein the transmitting the respective set of DMRSs within each of the two or more slots during the DMRS bundling window further comprises: transmitting the respective set of DMRSs within each of the two or more slots during the DMRS bundling window to the base station.

Aspect 18: A transmitting wireless communication device in a wireless communication network, comprising a transceiver; a memory; and a processor coupled to the transceiver and the memory, the processor and the memory configured to perform a method of any one of aspects 1 through 17.

Aspect 19: A transmitting wireless communication device in a wireless communication network comprising at least one means for performing a method of any one of aspects 1 through 17.

Aspect 20: A non-transitory computer-readable medium having stored therein instructions executable by one or more processors of a transmitting wireless communication device to perform a method of any one of aspects 1 through 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1,3, and/or 7-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A transmitting wireless communication device in a wireless communication network, comprising:
   a transceiver;
   a memory; and a processor coupled to the transceiver and the memory, wherein the processor and the memory are configured to:
  transmit a demodulation reference signal (DMRS) bundling indication to a receiving device, the DMRS bundling indication indicating a first capability of the transmitting wireless communication device to support DMRS bundling for channel estimation across two or more slots;
  transmit a phase continuity indication indicating a second capability of the transmitting wireless communication device to maintain phase continuity between the two or more slots, wherein the phase continuity indication indicates that the transmitting wireless communication device is capable of maintaining the phase continuity based on the two or more slots being non-consecutive slots; and
  transmit a respective set of DMRSs within each of the two or more slots to the receiving device during a DMRS bundling window based on the transmitting wireless communication device and the receiving device each supporting DMRS bundling and the phase continuity indication.

2. The transmitting wireless communication device of claim 1, wherein the phase continuity indication further indicates a maximum time gap between the non-consecutive slots over which the transmitting wireless communication device can maintain the phase continuity.

3. A transmitting wireless communication device in a wireless communication network, comprising:
  a transceiver;
  a memory; and
  a processor coupled to the transceiver and the memory, wherein the processor and the memory are configured to:
    transmit a demodulation reference signal (DMRS) bundling indication to a receiving device, the DMRS bundling indication indicating a first capability of the transmitting wireless communication device to support DMRS bundling for channel estimation across two or more slots;
    transmit a phase continuity indication indicating a second capability of the transmitting wireless communication device to maintain phase continuity between the two or more slots, wherein the phase continuity indication indicates a maximum degree of change in random phase terms between the two or more slots allowed to maintain the phase continuity; and
    transmit a respective set of DMRSs within each of the two or more slots to the receiving device during a DMRS bundling window based on the transmitting wireless communication device and the receiving device each supporting DMRS bundling and the phase continuity indication.

4. A transmitting wireless communication device in a wireless communication network, comprising:
  a transceiver;
  a memory; and
  a processor coupled to the transceiver and the memory, wherein the processor and the memory are configured to:
    transmit a demodulation reference signal (DMRS) bundling indication to a receiving device, the DMRS bundling indication indicating a first capability of the transmitting wireless communication device to support DMRS bundling for channel estimation across two or more slots;
    transmit a phase continuity indication indicating a second capability of the transmitting wireless communication device to maintain phase continuity between the two or more slots, wherein the phase continuity indication indicates that the transmitting wireless communication device is capable of maintaining the phase continuity in response to the transmitting wireless communication device switching a communication direction between the two or more slots; and
    transmit a respective set of DMRSs within each of the two or more slots to the receiving device during a DMRS bundling window based on the transmitting wireless communication device and the receiving device each supporting DMRS bundling and the phase continuity indication.

5. The transmitting wireless communication device of claim 1, wherein the phase continuity indication further indicates that the transmitting wireless communication device is capable of maintaining the phase continuity in response to the transmitting wireless communication device switching at least one of a beam or a transmit power between the two or more slots.

6. A transmitting wireless communication device in a wireless communication network, comprising:
  a transceiver;
  a memory; and
  a processor coupled to the transceiver and the memory, wherein the processor and the memory are configured to:
    transmit a demodulation reference signal (DMRS) bundling indication to a receiving device, the DMRS bundling indication indicating a first capability of the transmitting wireless communication device to support DMRS bundling for channel estimation across two or more slots;
    transmit a phase continuity indication indicating a second capability of the transmitting wireless communication device to maintain phase continuity between the two or more slots, wherein the phase continuity indication further indicates that the transmitting wireless communication device is capable of maintaining the phase continuity in response to the transmitting wireless communication device changing at least one of carrier frequency or a bandwidth between the two or more slots; and
    transmit a respective set of DMRSs within each of the two or more slots to the receiving device during a DMRS bundling window based on the transmitting wireless communication device and the receiving device each supporting DMRS bundling and the phase continuity indication.

7. The transmitting wireless communication device of claim 1, wherein the phase continuity indication further indicates that the transmitting wireless communication device will maintain the phase continuity between the two or more slots.

8. The transmitting wireless communication device of claim 1, wherein the processor and the memory are further configured to:
  receive an additional phase continuity indication indicating a third capability of the receiving device to maintain additional phase continuity between the two or more slots, and transmit the respective set of DMRSs within each of the two or more slots during the DMRS bundling window to the receiving device based on the phase continuity indication and the additional phase continuity indication.

9. The transmitting wireless communication device of claim 8, wherein the receiving device comprises a receiving wireless communication device, and wherein the processor and the memory are further configured to:
receive an additional DMRS bundling indication indicating a fourth capability of the receiving wireless communication device to support DMRS bundling.

10. The transmitting wireless communication device of claim 9, wherein the processor and the memory are further configured to:
receive a phase jump estimation indication from the receiving wireless communication device indicating a fifth capability of the receiving wireless communication device to estimate a phase jump between the two or more slots; and
transmit the respective set of DMRSs within each of the two or more slots during the DMRS bundling window to the receiving wireless communication device via a sidelink therebetween based on the phase jump estimation indication.

11. The transmitting wireless communication device of claim 10, wherein the phase jump estimation indication indicates that the receiving wireless communication device is capable of utilizing an automatic gain control (AGC) symbol or another symbol of a subsequent slot of the two or more slots for phase jump estimation.

12. The transmitting wireless communication device of claim 1, wherein the processor and the memory are further configured to:
transmit the DMRS bundling indication to a base station in wireless communication with the transmitting wireless communication device.

13. A transmitting wireless communication device in a wireless communication network, comprising:
a transceiver;
a memory; and
a processor coupled to the transceiver and the memory, wherein the processor and the memory are configured to:
transmit a demodulation reference signal (DMRS) bundling indication to a receiving device and a base station, the DMRS bundling indication indicating a first capability of the transmitting wireless communication device to support DMRS bundling for channel estimation across two or more slots;
transmit a respective set of DMRSs within each of the two or more slots to the receiving device via a sidelink during a DMRS bundling window based on the transmitting wireless communication device and the receiving device each supporting DMRS bundling.

14. The transmitting wireless communication device of claim 13, wherein the processor and the memory are further configured to:
transmit the respective set of DMRSs within each of the two or more slots during the DMRS bundling window to the base station.

15. A method for wireless communication at a transmitting wireless communication device in a wireless communication network, the method comprising:
transmitting a demodulation reference signal (DMRS) bundling indication to a receiving device, the DMRS bundling indication indicating a first capability of the transmitting wireless communication device to support DMRS bundling for channel estimation across two or more slots;
transmitting a phase continuity indication indicating a second capability of the transmitting wireless communication device to maintain phase continuity between the two or more slots, wherein the phase continuity indication indicates that the transmitting wireless communication device is capable of maintaining the phase continuity based on the two or more slots being non-consecutive slots; and
transmitting a respective set of DMRSs within each of the two or more slots during a DMRS bundling window to the receiving device based on the transmitting wireless communication device and the receiving device supporting DMRS bundling and the phase continuity indication.

16. The method of claim 15, wherein the phase continuity indication further indicates a maximum time gap between the non-consecutive slots over which the transmitting wireless communication device can maintain the phase continuity.

17. The method of claim 15, wherein the phase continuity indication further indicates that the transmitting wireless communication device is capable of maintaining the phase continuity in response to the transmitting wireless communication device switching at least one of a communication direction, a beam, a transmit power, a carrier frequency, or a bandwidth between the two or more slots.

18. The method of claim 15, further comprising:
receiving an additional phase continuity indication indicating a third capability of the receiving device to maintain additional phase continuity between the two or more slots, and wherein the transmitting the respective set of DMRSs within each of the two or more slots during the DMRS bundling window further comprises:
transmitting the respective set of DMRSs within each of the two or more slots during the DMRS bundling window to the receiving device based on the phase continuity indication and the additional phase continuity indication.

19. The method of claim 15, wherein the receiving device comprises a receiving wireless communication device, and further comprising:
receiving an additional DMRS bundling indication indicating a fourth capability of the receiving wireless communication device to support DMRS bundling.

20. The method of claim 19, further comprising:
receiving a phase jump estimation indication from the receiving wireless communication device indicating a fifth capability of the receiving wireless communication device to estimate a phase jump between the two or more slots, and wherein the transmitting the respective set of DMRSs within each of the two or more slots during the DMRS bundling window further comprises:
transmitting the respective set of DMRSs within each of the two or more slots during the DMRS bundling window to the receiving wireless communication device via a sidelink therebetween based on the phase jump estimation indication.

21. The method of claim 15, wherein the transmitting the DMRS bundling indication further comprises:
transmitting the DMRS bundling indication to a base station in wireless communication with the transmitting wireless communication device.

22. The method of claim 21, wherein the transmitting the respective set of DMRSs within each of the two or more slots during the DMRS bundling window further comprises:
- transmitting the respective set of DMRSs within each of the two or more slots during the DMRS bundling window to the receiving device via a sidelink therebetween.

23. The method of claim 21, wherein the receiving device comprises the base station, and wherein the transmitting the respective set of DMRSs within each of the two or more slots during the DMRS bundling window further comprises:
- transmitting the respective set of DMRSs within each of the two or more slots during the DMRS bundling window to the base station.

24. A transmitting wireless communication device in a wireless communication network, comprising:
- means for transmitting a demodulation reference signal (DMRS) bundling indication to a receiving device, the DMRS bundling indication indicating a first capability of the transmitting wireless communication device to support DMRS bundling for channel estimation across two or more slots;
- means for transmitting a phase continuity indication indicating a second capability of the transmitting wireless communication device to maintain phase continuity between the two or more slots, wherein the phase continuity indication indicates that the transmitting wireless communication device is capable of maintaining the phase continuity based on the two or more slots being non-consecutive slots; and
- means for transmitting a respective set of DMRSs within each of the two or more slots during a DMRS bundling window to the receiving device based on the transmitting wireless communication device and the receiving device supporting DMRS bundling and the phase continuity indication.

* * * * *